United States Patent
Glime, III et al.

(10) Patent No.: US 11,965,605 B2
(45) Date of Patent: Apr. 23, 2024

(54) FLUID COMPONENT BODY AND METHOD OF MAKING SAME

(71) Applicant: Swagelok Company, Solon, OH (US)

(72) Inventors: William H. Glime, III, Chagrin Falls, OH (US); Branden W. Keeper, Mentor, OH (US); Samuel Gunther Houser, Southington, OH (US); Theodore J. Gausman, Lyndhurst, OH (US)

(73) Assignee: SWAGELOK COMPANY, Solon, OH (US)

( * ) Notice: Subject to any disclaimer, the term of this patent is extended or adjusted under 35 U.S.C. 154(b) by 31 days.

(21) Appl. No.: 17/499,919

(22) Filed: Oct. 13, 2021

(65) Prior Publication Data

US 2022/0042616 A1   Feb. 10, 2022

Related U.S. Application Data

(63) Continuation of application No. 16/445,365, filed on Jun. 19, 2019, now Pat. No. 11,168,801.
(Continued)

(51) Int. Cl.
*B21D 7/00*   (2006.01)
*B33Y 10/00*   (2015.01)
(Continued)

(52) U.S. Cl.
CPC .............. *F16K 27/003* (2013.01); *B21D 7/00* (2013.01); *B33Y 10/00* (2014.12);
(Continued)

(58) Field of Classification Search
CPC ... F16K 27/003; F16K 27/0236; B33Y 10/00; B21D 7/00; B22F 10/66; B22F 10/20; B22F 10/47
See application file for complete search history.

(56) References Cited

U.S. PATENT DOCUMENTS

| | | | | |
|---|---|---|---|---|
| 4,589,595 A | ‡ | 5/1986 | Havens | A01G 25/023 138/46 |
| 4,991,293 A | * | 2/1991 | Bartholomew | B21D 7/028 72/369 |

(Continued)

FOREIGN PATENT DOCUMENTS

| | | | |
|---|---|---|---|
| EP | 0735302 | * | 10/1996 |
| EP | 735302 | | 10/1996 |

(Continued)

OTHER PUBLICATIONS

Machine Translation of EP0735302 (Year: 1996).‡
(Continued)

*Primary Examiner* — Monica A Huson
*Assistant Examiner* — Kelsey C Grace
(74) *Attorney, Agent, or Firm* — Calfee, Halter & Griswold LLP

(57) ABSTRACT

A method of fabricating a fluid component body includes forming a monolithic fluid component body including a valve segment having an annular upper perimeter wall portion defining a valve cavity and a lower base portion defining first and second flow ports, and a conduit segment extending from one of the first and second flow ports and including a conduit end portion defining a tubular portion extending in a first direction and spaced apart from a remainder of the fluid component body. The conduit end portion is bent from the first direct to a second direction.

20 Claims, 25 Drawing Sheets

Related U.S. Application Data

(60) Provisional application No. 62/801,383, filed on Feb. 5, 2019, provisional application No. 62/691,171, filed on Jun. 28, 2018.

(51) Int. Cl.
    *F16K 27/00*     (2006.01)
    *F16K 27/02*     (2006.01)
    *B22F 10/20*     (2021.01)
    *B22F 10/47*     (2021.01)
    *B22F 10/66*     (2021.01)

(52) U.S. Cl.
    CPC .......... *F16K 27/0236* (2013.01); *B22F 10/20* (2021.01); *B22F 10/47* (2021.01); *B22F 10/66* (2021.01)

(56) References Cited

U.S. PATENT DOCUMENTS

| | | | | |
|---|---|---|---|---|
| 5,378,524 | A | ‡ | 1/1995 | Blood .................. F42B 10/22 428/141 |
| 5,765,591 | A | | 6/1998 | Wasson |
| 6,467,502 | B1 | | 10/2002 | Johnson et al. |
| 9,163,741 | B2 | ‡ | 10/2015 | Trenz ................. F16K 27/0236 |
| 9,470,247 | B2 | ‡ | 10/2016 | Alaze ................. F15B 13/0814 |
| 9,759,356 | B2 | * | 9/2017 | Ott ......................... F02C 7/222 |
| 9,863,542 | B2 | ‡ | 1/2018 | Glime .................... C02F 1/325 |
| 9,879,795 | B2 | ‡ | 1/2018 | Burkhart ............... B33Y 80/00 |
| 2002/0020451 | A1 | ‡ | 2/2002 | Reid, II .............. F15B 13/0892 137/884 |
| 2004/0118466 | A1 | ‡ | 6/2004 | Ford .................. F15B 13/0857 137/884 |
| 2005/0284529 | A1 | ‡ | 12/2005 | Iwabuchi ........... F15B 13/0892 137/884 |
| 2017/0175783 | A1 | ‡ | 6/2017 | Debernardi ............. F16L 37/56 |
| 2017/0203511 | A1 | ‡ | 7/2017 | Burkhart ............... B29C 64/393 |
| 2018/0112788 | A1 | ‡ | 4/2018 | Ishibashi ................. F16K 7/00 |
| 2020/0248831 | A1 | | 8/2020 | Keeper et al. |

FOREIGN PATENT DOCUMENTS

| | | | |
|---|---|---|---|
| EP | 927322 | | 7/1999 |
| JP | 1997119283 | ‡ | 5/1997 |
| WO | 1997/19283 | | 5/1997 |
| WO | 2005/100833 | | 10/2005 |

OTHER PUBLICATIONS

Office action from European Application No. 19739465.3 dated Feb. 13, 2023.
Office action from Chinese Application No. 2019800431889 dated Mar. 14, 2023.
Search Report and Written Opinion from Singapore Application No. 11202012859W dated Nov. 16, 2021.
International Search Report from PCT/US2019/037857 dated Nov. 11, 2019.
Office action from Chinese Application No. 201980043188.9 dated Aug. 19, 2022.

\* cited by examiner
‡ imported from a related application

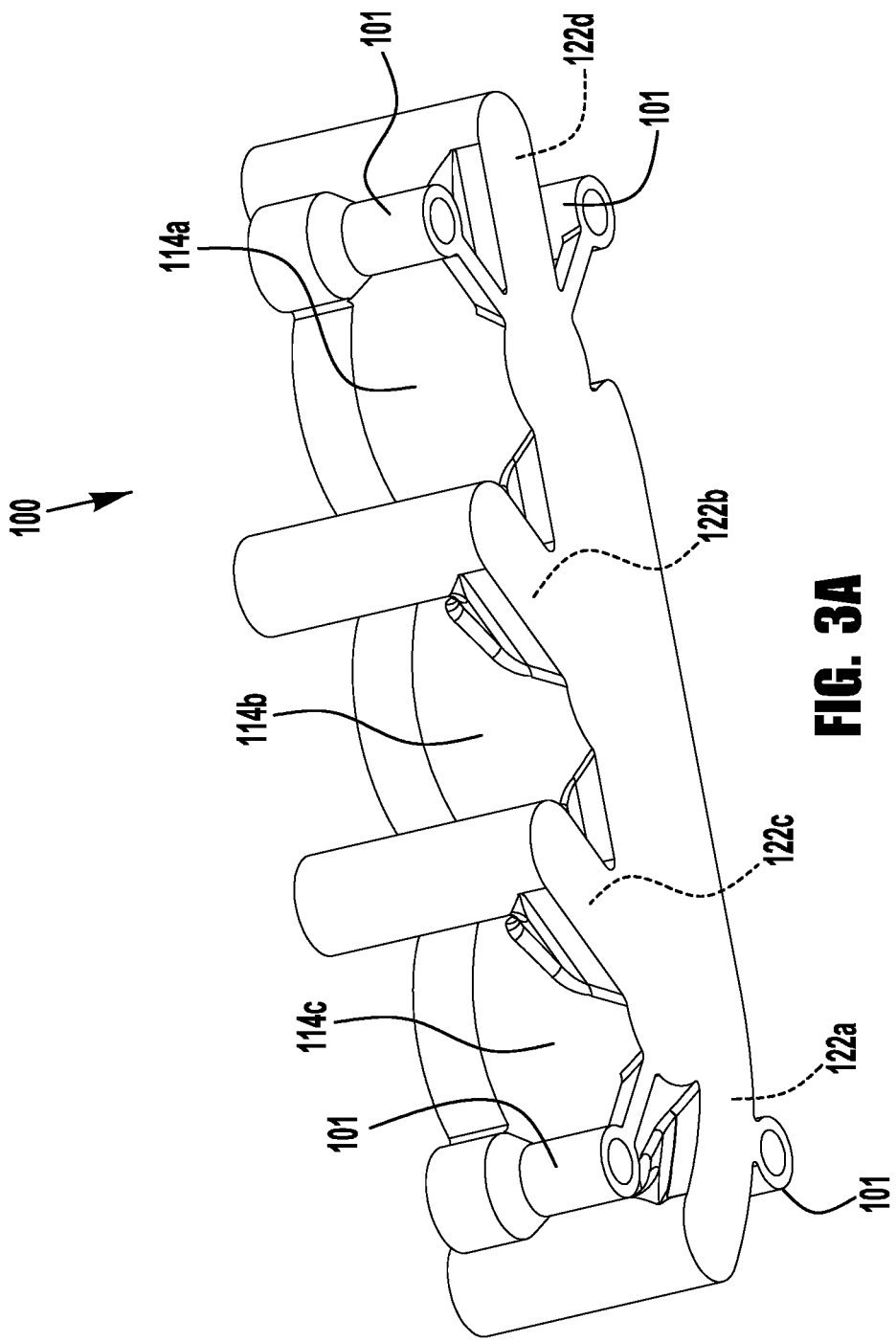

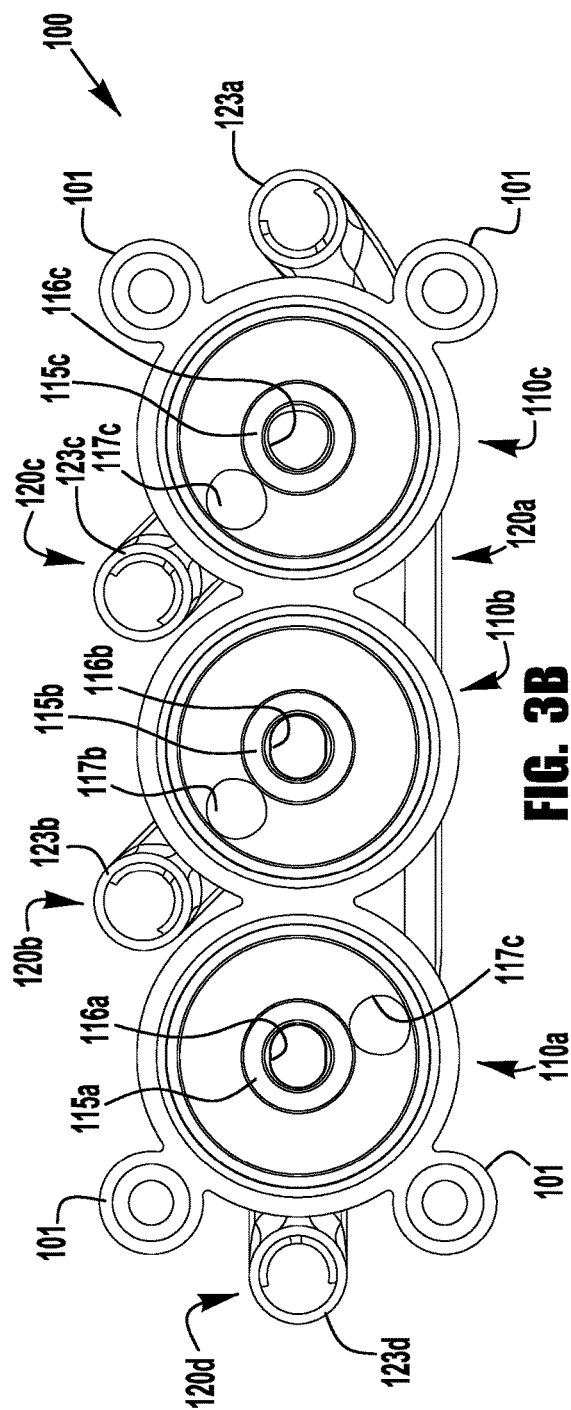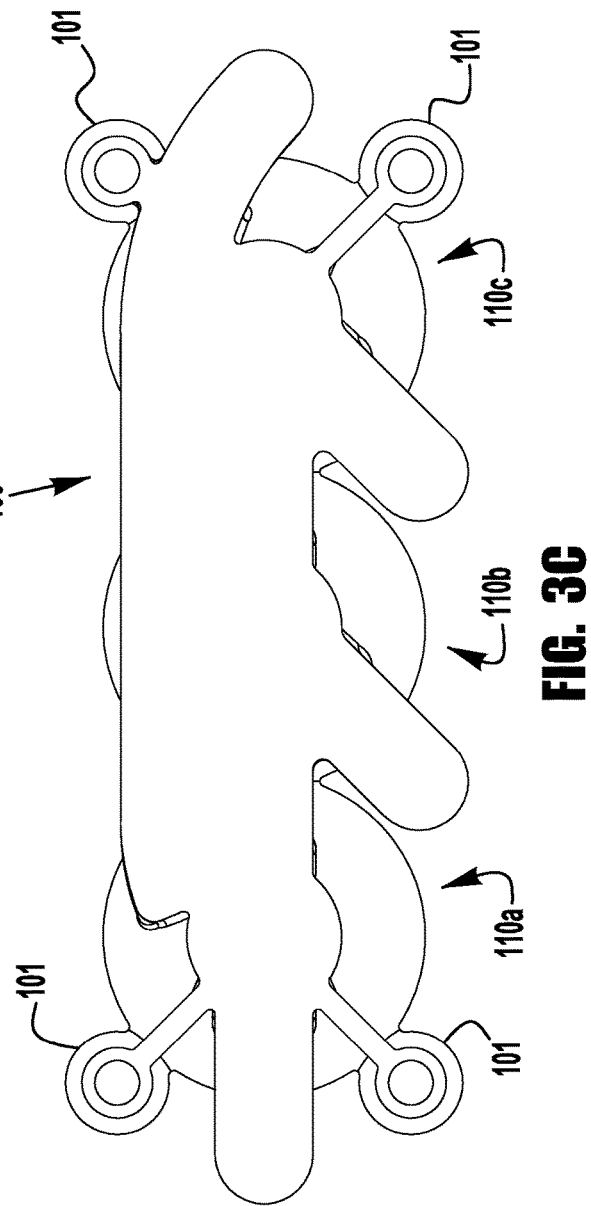

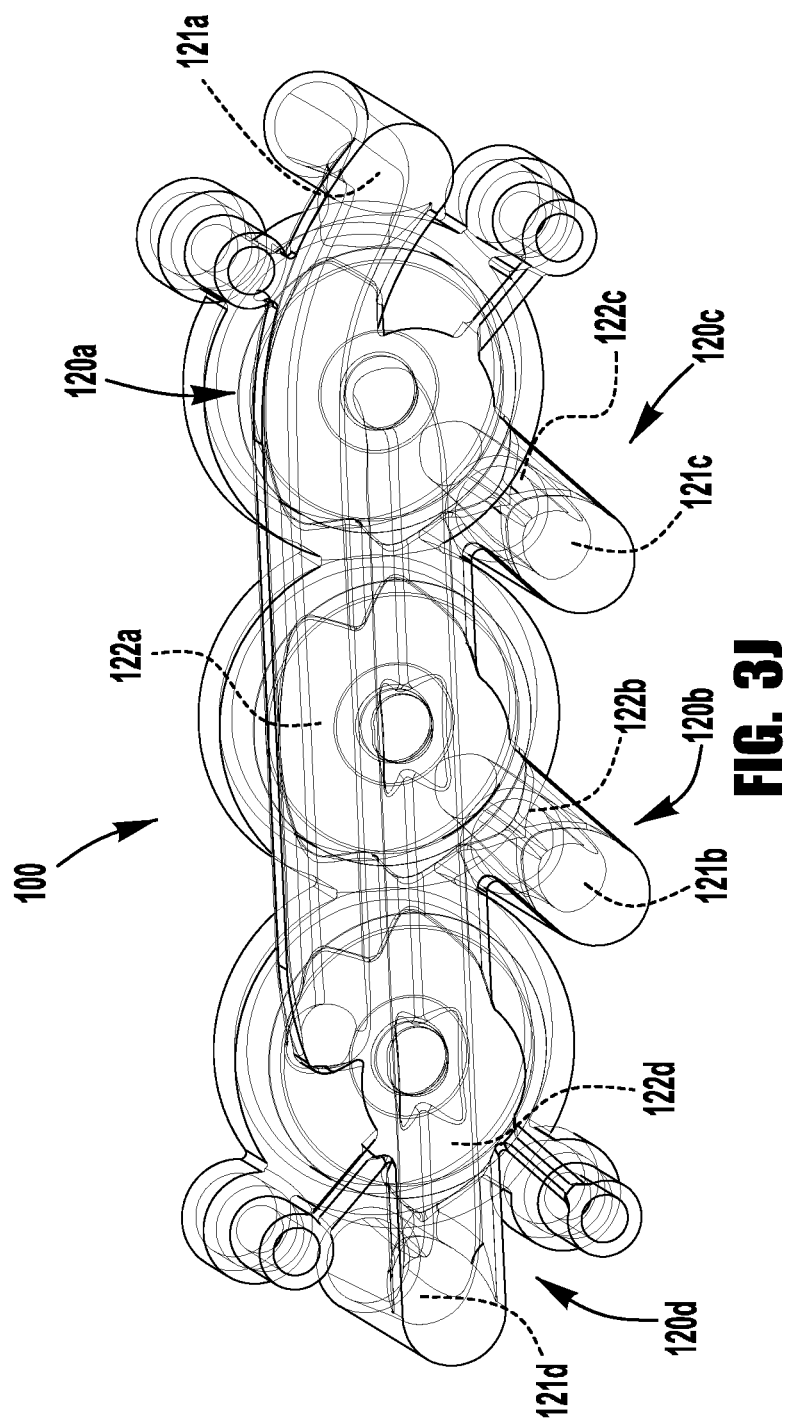

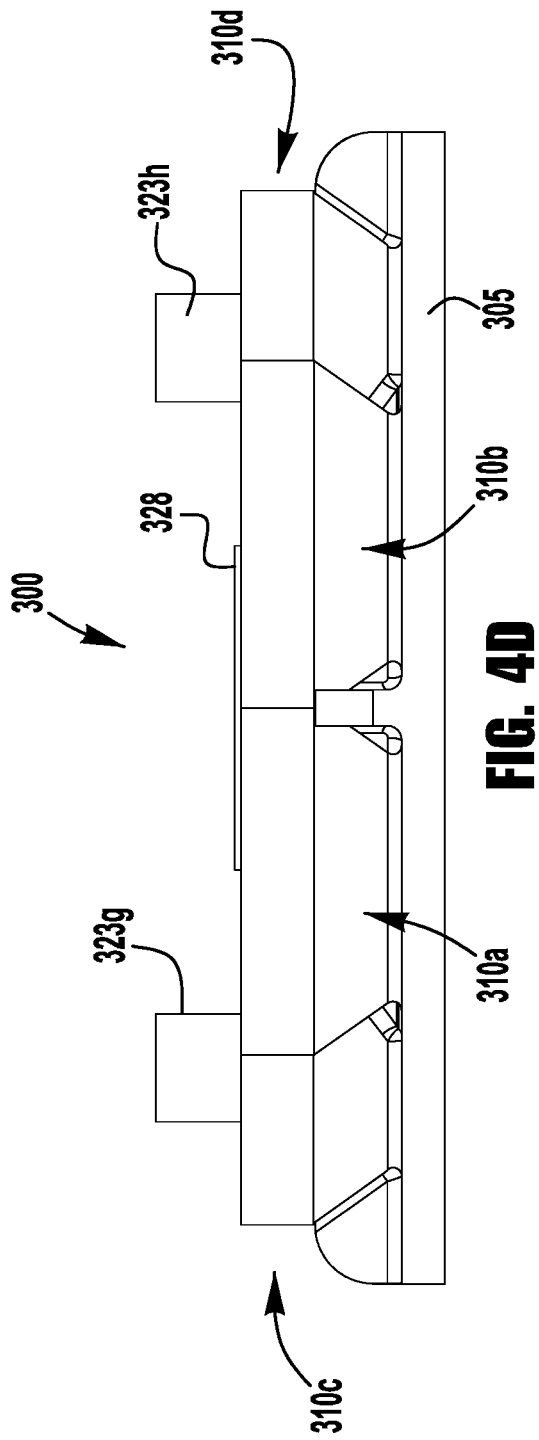
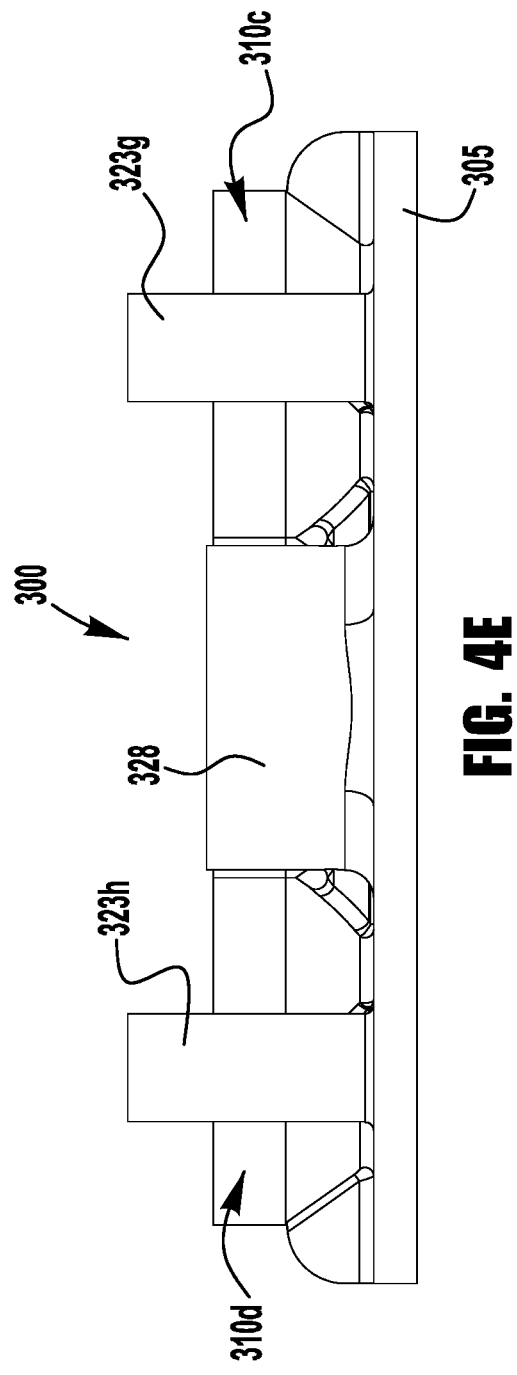

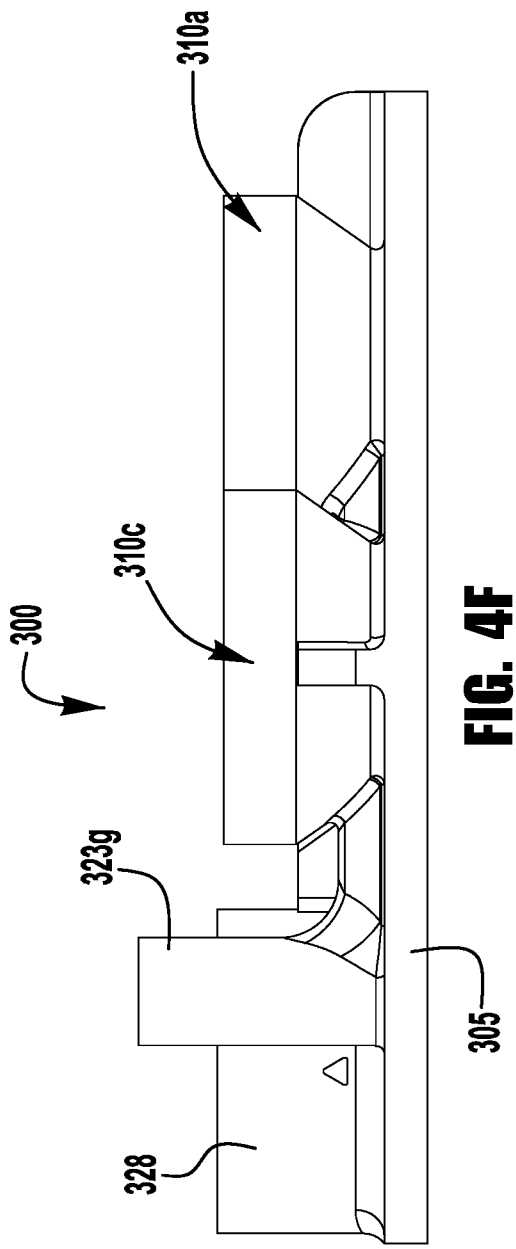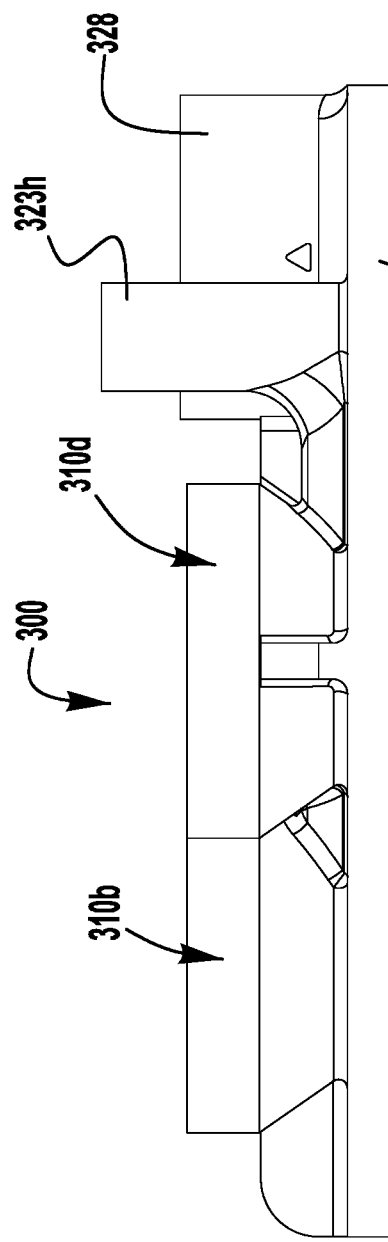

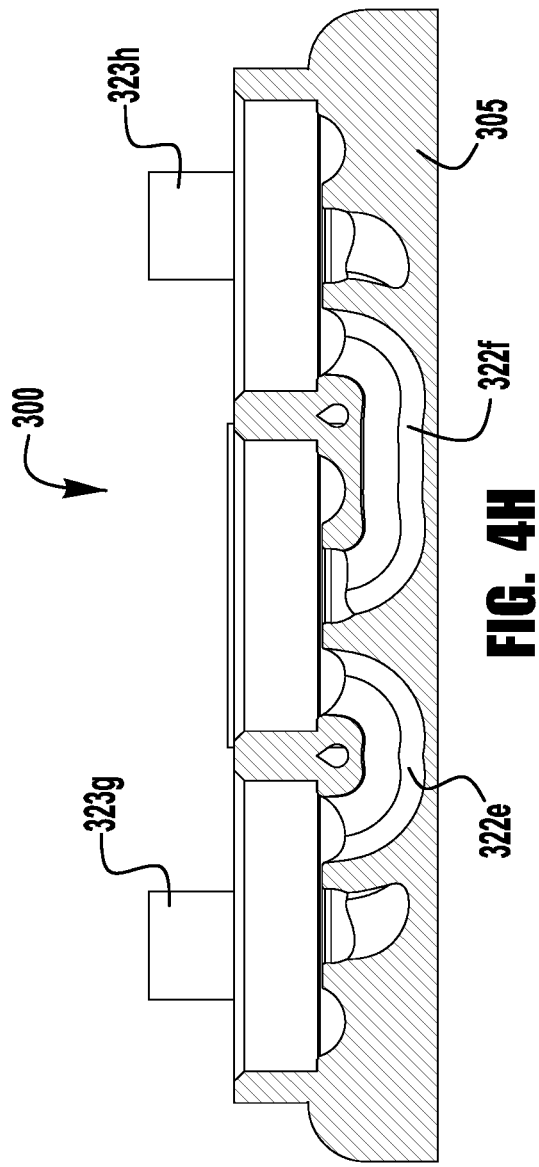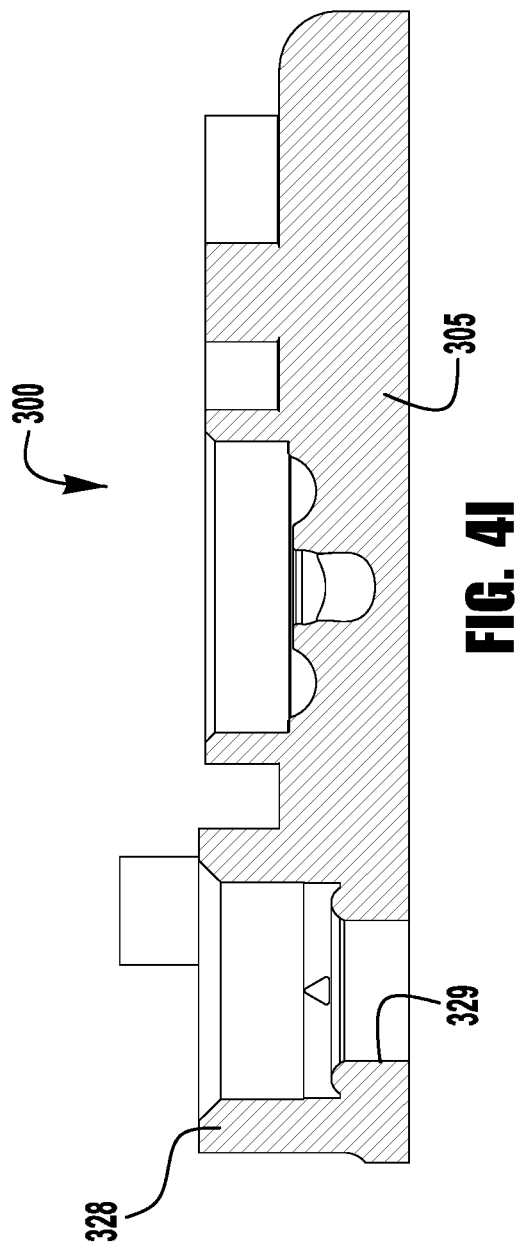

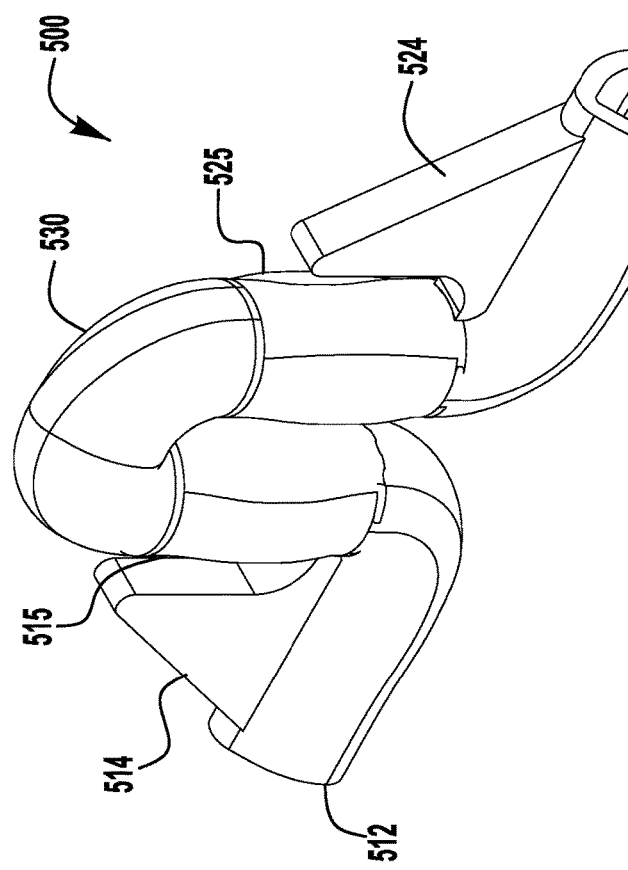
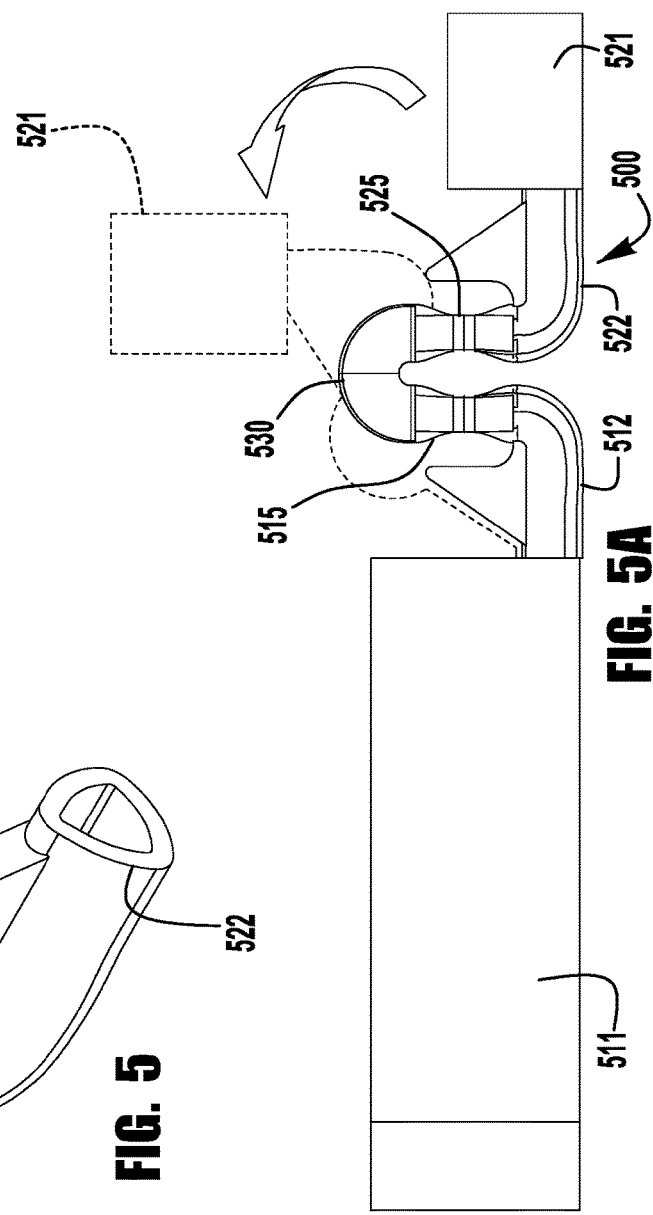
FIG. 5
FIG. 5A

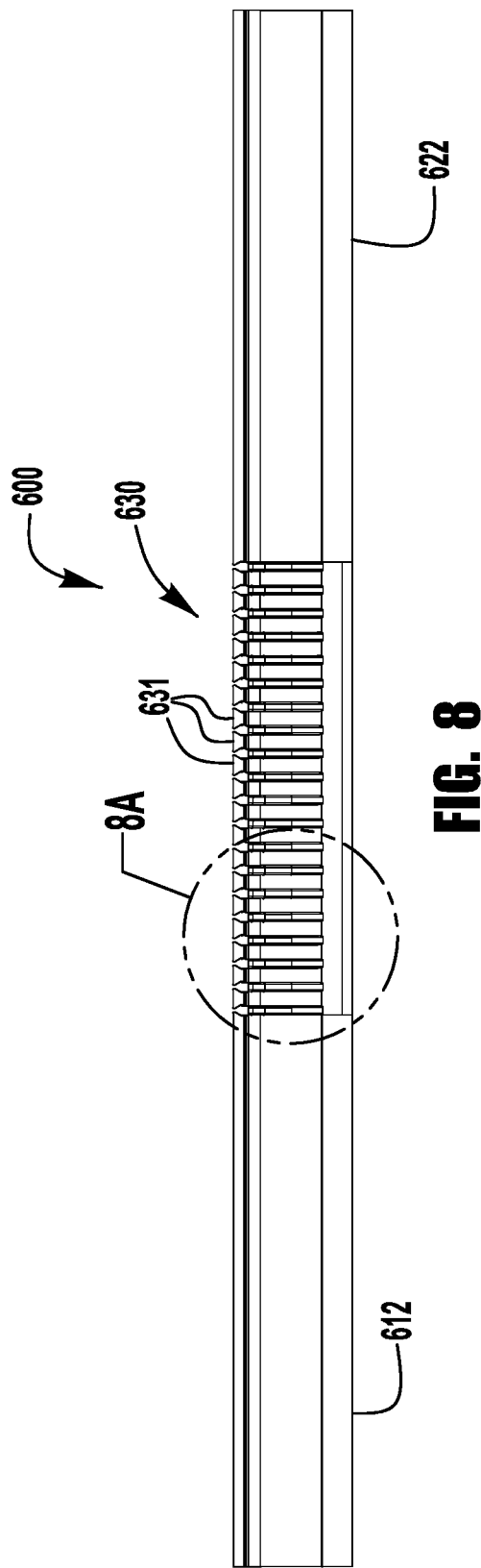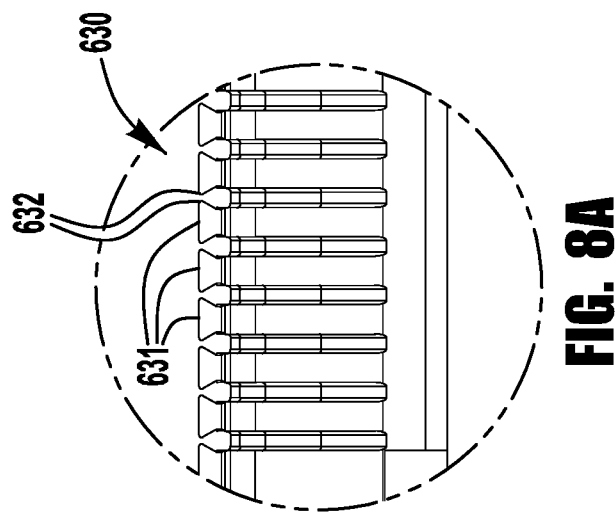

FLUID COMPONENT BODY AND METHOD OF MAKING SAME

CROSS-REFERENCE TO RELATED APPLICATION

This application is a continuation application of U.S. Ser. No. 16/445,365, filed on Jun. 16, 2019 which claims priority to and all benefit of U.S. Provisional Patent Application Ser. No. 62/691,171, filed on Jun. 28, 2018 and entitled FLUID COMPONENT BODY AND METHOD OF MAKING SAME, and U.S. Provisional Patent Application Ser. No. 62/801,383, filed on Feb. 5, 2019 and entitled FLUID COMPONENT AND METHOD OF MAKING SAME, the entire disclosures of each of which are incorporated herein by reference.

BACKGROUND

Fluid systems often include multiple valves arranged for mixing, switching, purging, and other such controls of one or more types of fluid, for example, for gas distribution employed in the manufacture of semiconductor wafers. While such fluid control systems may be constructed by welding or otherwise connecting individual valves in a desired configuration, such arrangements may be undesirable due to the time and cost of construction, potential leak points at the many connections, overall size of the assembly, and other such factors.

Multiple valve manifolds have often been used to address one or more of these issues by providing a single body block, machined for desired flow path arrangements, in which multiple valve assemblies are installed to control flow at multiple points within the multi-ported manifold body block. The manifold body block itself, however, may be expensive and difficult to machine, and may be limited in the shapes and orientations of internal ports that may be provided. Additionally, polished surface finish requirements for the manifold body flow paths may be difficult to maintain where the flow paths are extended and/or complex (non-straight).

SUMMARY

In an exemplary embodiment of the present disclosure, a manifold body includes first and second valve segments each comprising an annular upper perimeter wall portion defining a valve cavity and a lower base portion defining first and second flow ports, wherein the upper perimeter wall of the first valve segment includes a portion that is fused with an adjacent portion of the upper perimeter wall of the second valve segment, and a conduit segment defining a fluid flow path including a first leg flow path portion defining a conduit end portion and a second leg flow path portion extending from the first leg flow path portion to one of the first and second flow ports of the first valve segment.

In another exemplary embodiment of the present disclosure, a fluid component body includes an extended fluid flow path having one or more discontinuities adapted to provide increases in one or more of flow shear, flow compression, and flow incidence when the fluid flow path is treated with an abrasive laden fluid.

In another exemplary embodiment of the present disclosure, a fluid component body includes an internal fluid flow path having a pattern of surface discontinuities.

In another exemplary embodiment of the present disclosure, a method of fabricating a fluid component body includes forming a monolithic fluid component body including a valve segment having an annular upper perimeter wall portion defining a valve cavity and a lower base portion defining first and second flow ports, and a conduit segment extending from one of the first and second flow ports and including a conduit end portion defining a tubular portion extending in a first direction and spaced apart from a remainder of the fluid component body. The conduit end portion is bent from the first direct to a second direction.

In another exemplary embodiment of the present disclosure, a method of fabricating a fluid component includes forming, using additive manufacturing, a conduit having first and second portions connected by a central portion. The central portion of the conduit is bent to reorient the second portion of the conduit with respect to the first portion of the conduit.

BRIEF DESCRIPTION OF THE DRAWINGS

Further advantages and benefits will become apparent to those skilled in the art after considering the following description and appended claims in conjunction with the accompanying drawings, in which:

FIG. 3A illustrates a lower rear perspective view of the manifold body of FIG. 3;

FIG. 3B illustrates a top plan view of the manifold body of FIG. 3;

FIG. 3C illustrates a bottom plan view of the manifold body of FIG. 3;

FIG. 3J illustrates a bottom perspective view of the manifold body of FIG. 3, shown in phantom to illustrate additional features of the manifold body;

FIG. 4D illustrates a front elevational view of the manifold body of FIG. 4;

FIG. 4E illustrates a rear elevational view of the manifold body of FIG. 4;

FIG. 4F illustrates a left side elevational view of the manifold body of FIG. 4;

FIG. 4G illustrates a right side elevational view of the manifold body of FIG. 4;

FIG. 4H illustrates a first cross-sectional view of the manifold body of FIG. 4;

FIG. 4I illustrates a second cross-sectional view of the manifold body of FIG. 4;

FIG. 5 illustrates a perspective view of conduit portion of a fluid component, configured to facilitate bending, in accordance with an exemplary embodiment;

FIG. 5A illustrates the fluid component of FIG. 5, shown undergoing a bending operation;

FIG. 8 illustrates a front view of a conduit portion of another fluid component, configured to facilitate bending, in accordance with an exemplary embodiment;

FIG. 8A illustrates an enlarged partial view of a bendable portion of the conduit portion of FIG. 8;

DETAILED DESCRIPTION OF EXEMPLARY EMBODIMENTS

Figure 1:
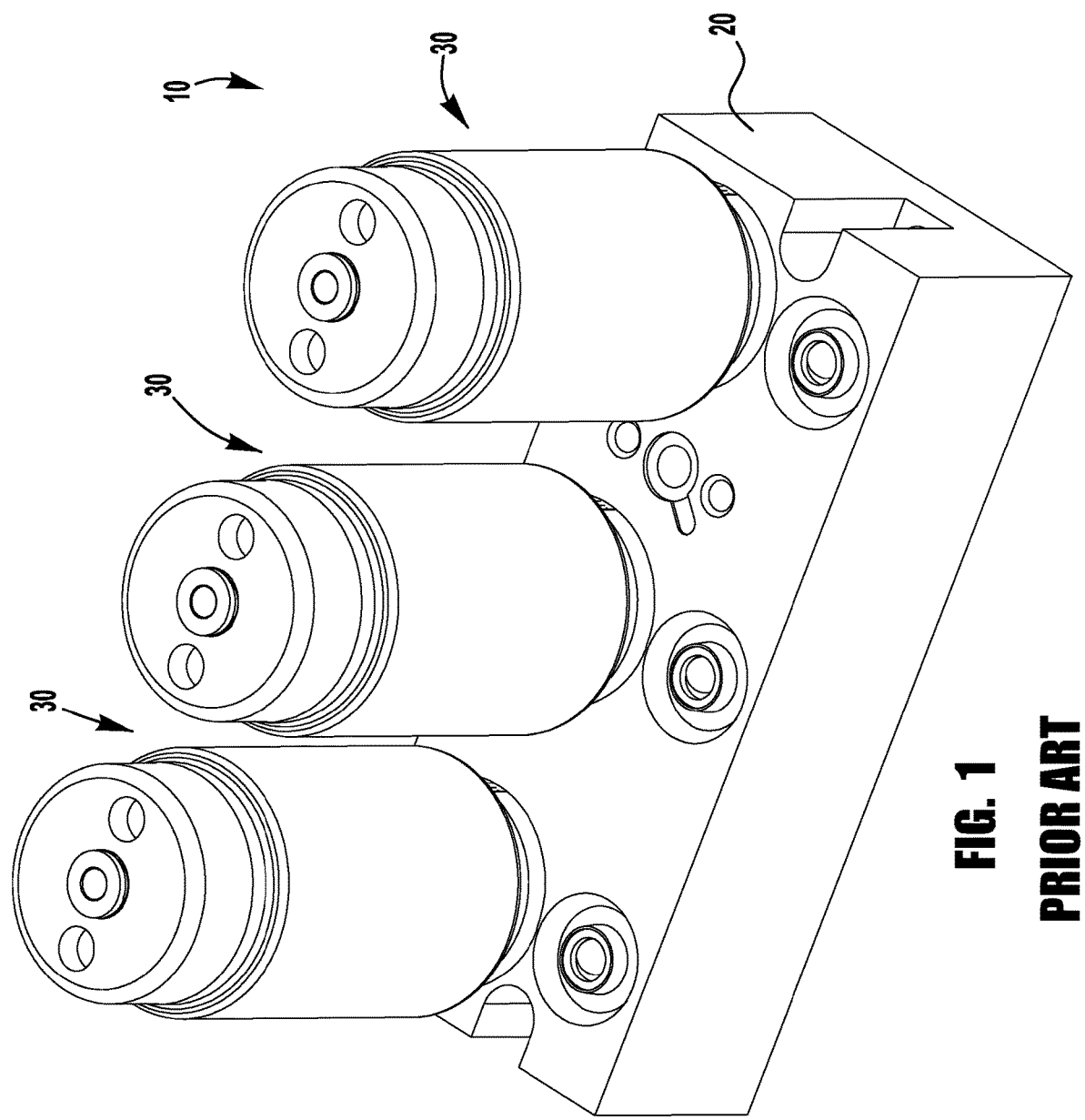
FIG. 1 illustrates a perspective view of an exemplary diaphragm valve manifold assembly.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present application describe multiple diaphragm valve manifolds, one of more of the features described herein may additionally or alternatively be applied to other types of multiple valve manifolds (e.g., bellows valves, needle valves, etc.), single valve assemblies, and other fluid system components (e.g., pressure regulators, filters, etc.). Additionally, while the geometries and arrangements of many of the manifold body features described herein are such that their production is facilitated by additive manufacturing, such as 3-D printing, other manufacturing methods may be utilized to fabricate body components having one or more of the features described herein, such as, for example, stacked plate assembly, machining, welding, brazing, and casting (e.g., investment casting, sand casting, lost wax casting), independently or in combination.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In the present disclosure, the term "vertical" is used to describe a direction substantially perpendicular to a base (or bottom) surface of the fluid component body, and the term "horizontal" is used to describe a direction substantially parallel to the base surface of the fluid component body. It is to be understood that the fluid component body may be mounted or arranged in any suitable orientation (e.g., with the base surface of the fluid component body extending substantially vertically, or at some other angle).

Figure 1A:
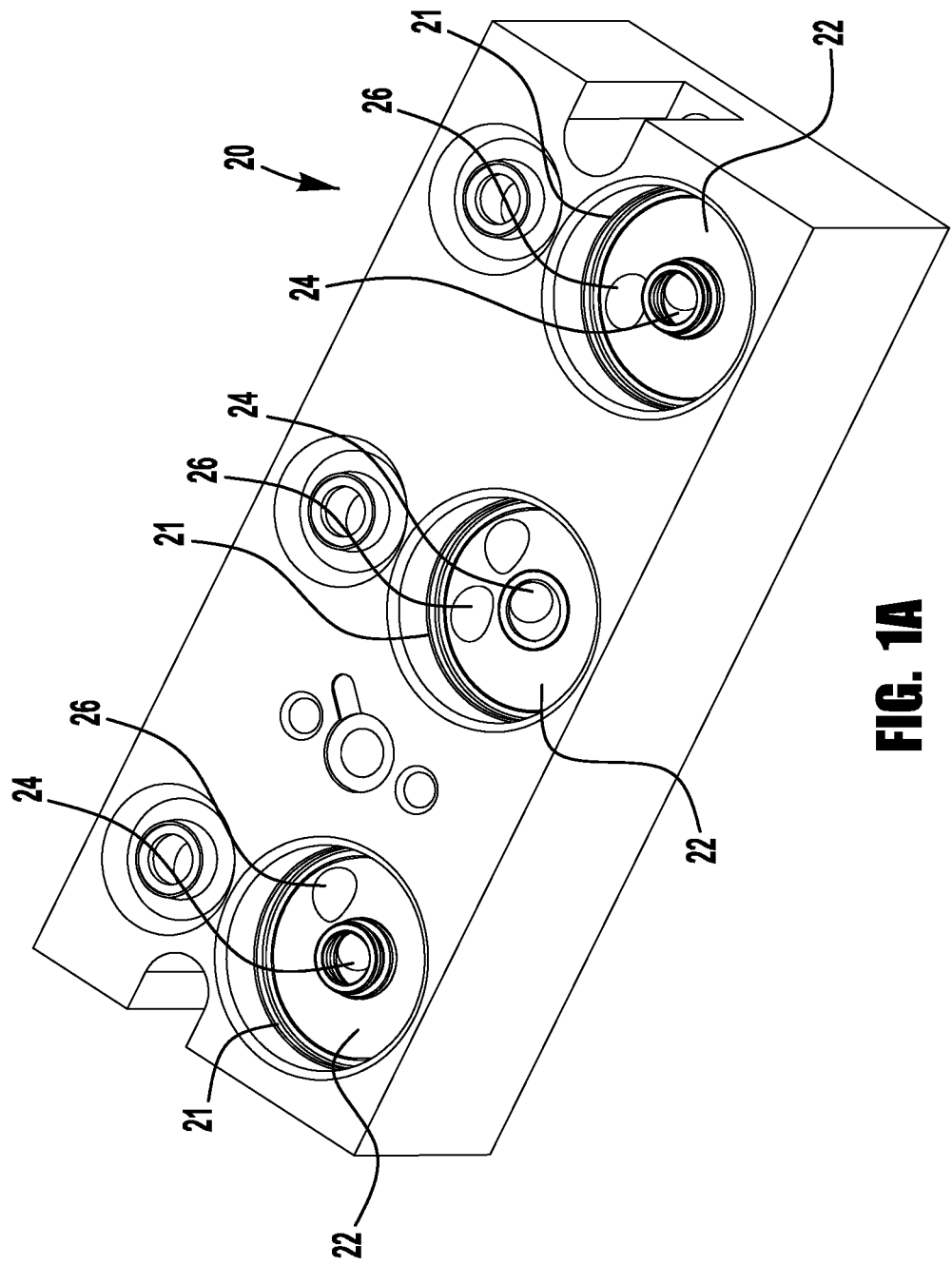
FIG. 1A illustrates a perspective view of the manifold block body of the manifold assembly of FIG. 1.

FIG. 1 illustrates an exemplary conventional three-valve manifold 10 having a manifold body block 20 and diaphragm valves 30 installed in corresponding valve cavities 21 machined in the body block 20. Each valve cavity 21 includes a recessed surface or trepan 22 and a bore wall 23 (FIG. 1A), with at least first and second ports 24, 26 provided in the recessed surface 22.

Figure 2:
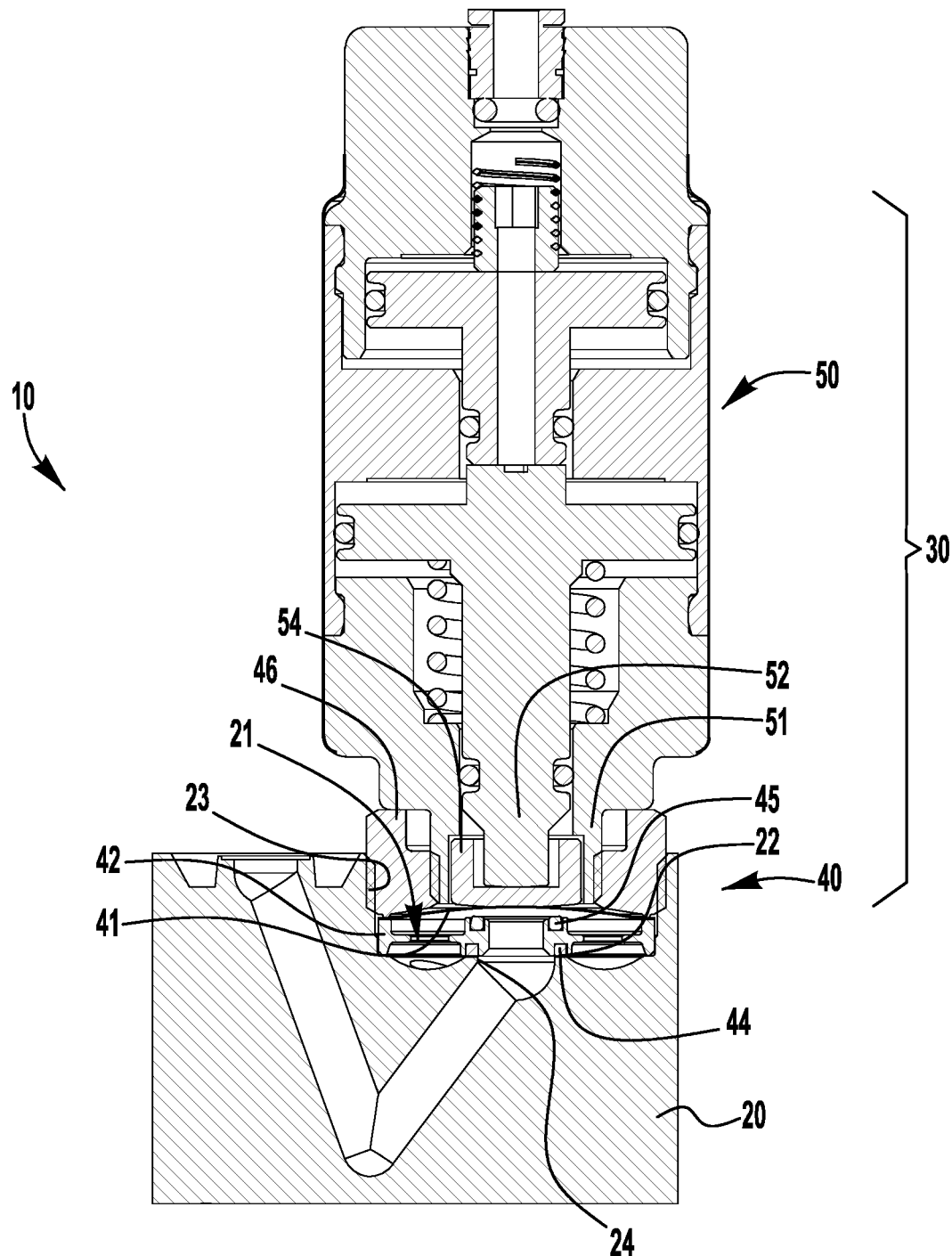
FIG. 2 illustrates a side cross-sectional view of the manifold assembly of FIG. 1, taken through the line 2-2.

Referring to the cross-sectional view of FIG. 2, each valve 30 includes a valve subassembly 40 and an actuator 50. The exemplary valve subassemblies 40 each include a flexible diaphragm 41 and an annular seat carrier 42 received in the valve cavity 21 and including a lower seal portion 44 that seals against the recessed surface 22 around the first port 24 and an upper seal portion 45 that seals against the diaphragm 41 when the diaphragm is moved to the closed position. A threaded retainer 46 is installed in the valve cavity 21 to clamp the seat carrier 42 and diaphragm 41 against the recessed surface 22, with an outer male threaded portion of the retainer 46 mating with an inner female threaded portion of the bore wall 23. A male threaded bonnet portion 51 of the actuator 50 is threaded into a female threaded portion of the retainer 46 to connect the actuator 50 with the valve subassembly 40 and to position the actuator stem 52 for operative engagement (e.g., using intermediary button 54) with the diaphragm 41. A similar actuated valve assembly is shown and described in co-owned U.S. Pat. No. 9,863,542 (the "'542 Patent"), the entire disclosure of which is incorporated herein by reference.

Figure 3:
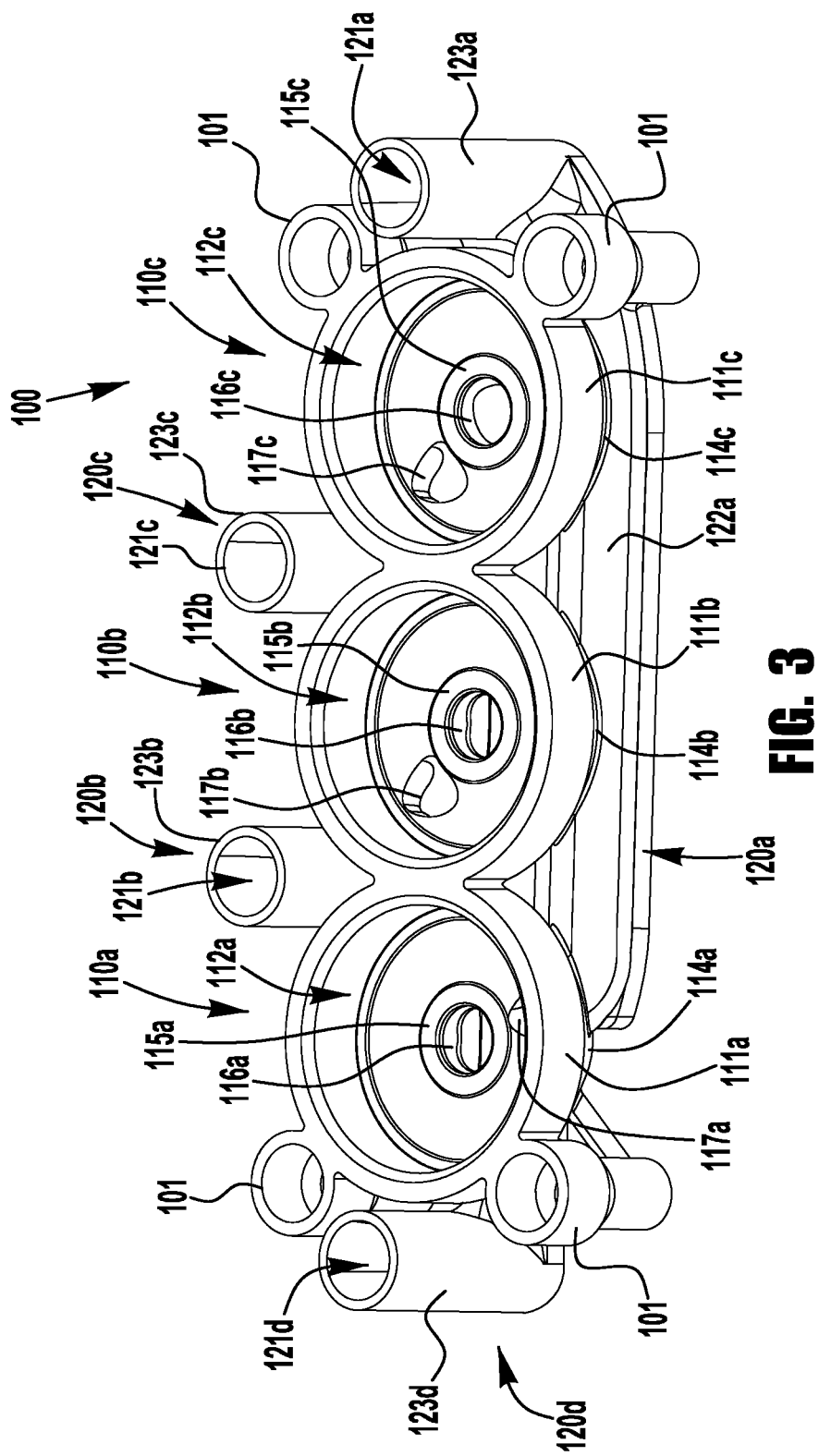
FIG. 3 illustrates an upper front perspective view of a three-valve manifold body, in accordance with an exemplary embodiment of the present disclosure.
Figure 3D:
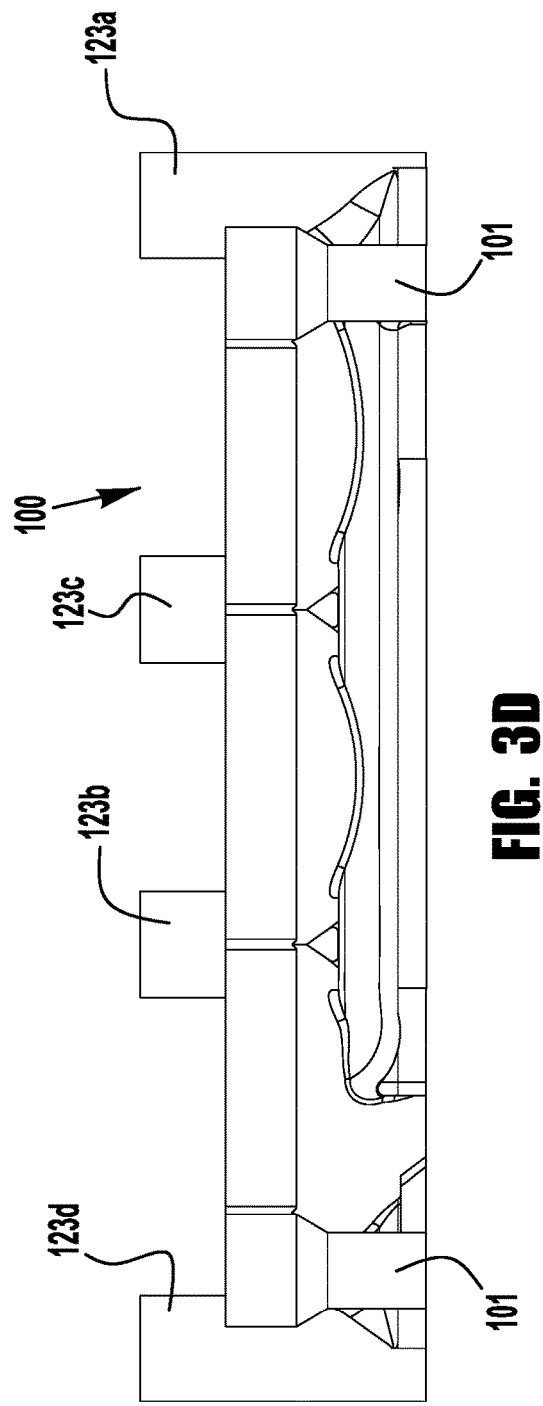
FIG. 3D illustrates a front elevational view of the manifold body of FIG. 3.
Figure 3E:
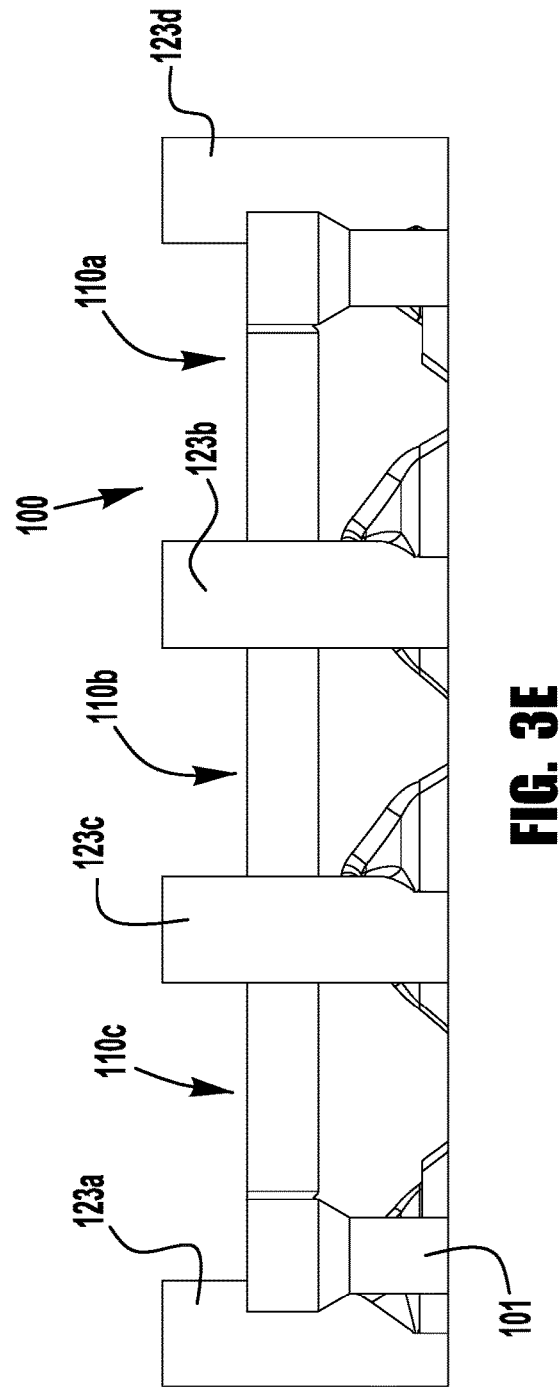
FIG. 3E illustrates a rear elevational view of the manifold body of FIG. 3.
Figure 3F:
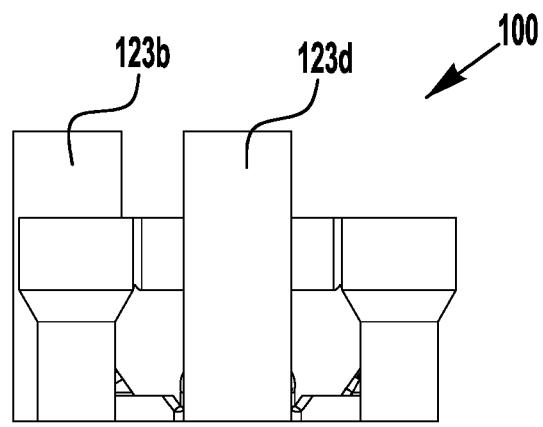
FIG. 3F illustrates a left side elevational view of the manifold body of FIG. 3.
Figure 3G:
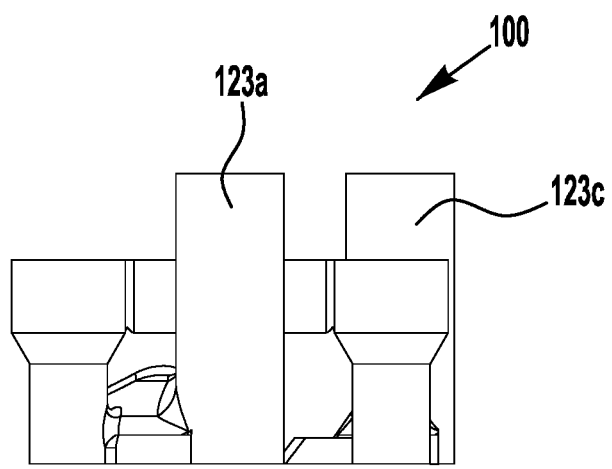
FIG. 3G illustrates a right side elevational view of the manifold body of FIG. 3.
Figure 3H:
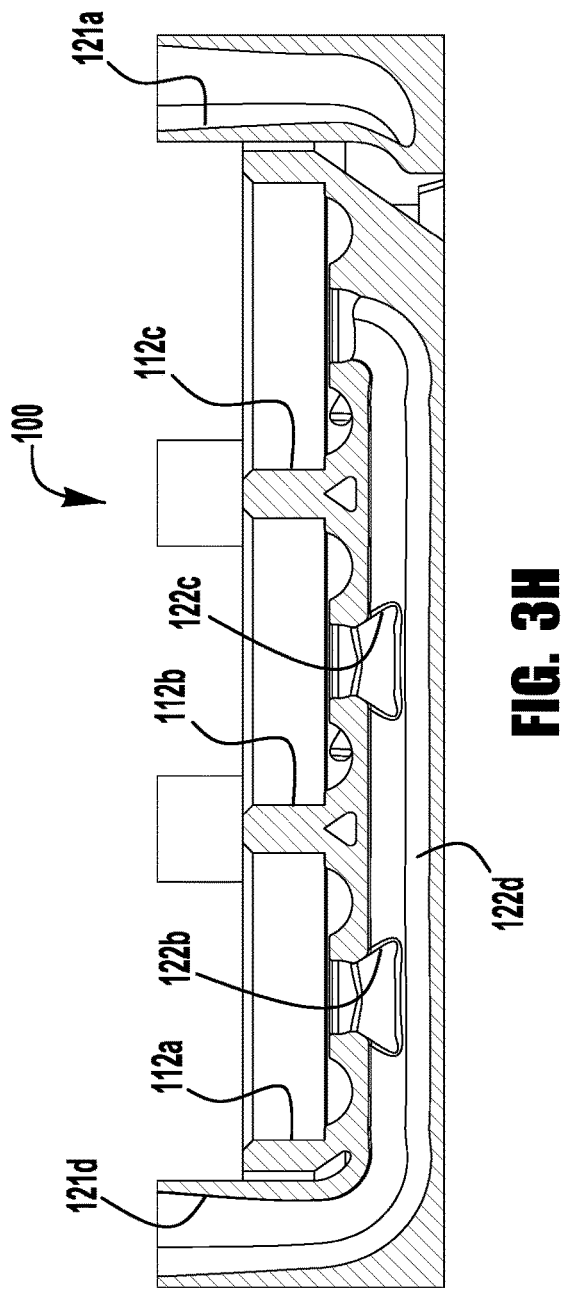
FIG. 3H illustrates a first cross-sectional view of the manifold body of FIG. 3.

According to an aspect of the present application, a multi-valve manifold body may be formed as a plurality of discrete valve body segments and conduit segments integrated into a single-piece, monolithic construction having a reduced size, weight, and raw material usage as compared to a corresponding manifold body block. FIGS. 3-3J illustrates an exemplary three-valve manifold body 100 corresponding to (but not functionally identical to) the three-valve manifold body block 20 of FIG. 1A. As shown, the manifold body 100 includes a plurality of valve body segments 110a, 110b, 110c each having an upper perimeter wall portion 111a, 111b, 111c defining a valve cavity 112a, 112b, 112c, and a lower base portion 114a, 114b, 114c defining central flow ports 116a, 116b, 116c and offset flow ports 117a, 117b, 117c.

The manifold body 100 further includes a plurality of conduit segments 120a, 120b, 120c, 120d having first leg (e.g., vertical) portions 121a, 121b, 121c, 121d defining conduit end portions or tube ends 123a, 123b, 123c, 123d for connection to fluid system components (e.g., conduits) in the fluid system (e.g., by welding or conduit fittings), and extending to second leg (e.g., horizontal) portions 122a, 122b, 122c, 122d extending to the flow ports 116a, 116b, 116c, 117a, 117b, 117c. In an exemplary embodiment, a fitting connector (e.g., a VCR® metal gasket face seal fitting gland) may be welded to the tube stub to facilitate connection with a fluid system.

While the conduit end portions 123a, 123b, 123c, 123d of the illustrated embodiment extend substantially vertically upward, in other embodiments, the conduit end portions may extend in other directions, including, for example, at an upward non-vertical angle, horizontally, vertically downward, or at a downward non-vertical angle. Further, while such conduit end portions may be fabricated to extend in such directions, in other embodiments, the conduit end portions may be fabricated to extend in a first direction (e.g., vertically upward), and then be bent to extend in a second direction (e.g., horizontally). The conduit end portions may be specifically fabricated to facilitate such bending. For example, the conduit end portion may be formed or fabricated to have a reduced wall thickness on the portions of the conduit end portion subject to bending (e.g., at the axial location of the bend, and/or in the direction of the bend). As another example, the conduit end portion may be provided with a cross-sectional shape selected to facilitate bending—for example, an oblong or high aspect ratio cross-section (e.g., oval-shaped) having a minor diameter oriented in the direction of the intended bend. As yet another example, an external surface of the fluid component body may be provided with a bending limit feature, such as, for example, a boss, wall, protrusion, or other body structure sized and positioned to limit bending of the conduit end portion to a desired angle (e.g., by abutting an outer surface of the conduit end portion at the desired angle).

In the illustrated embodiment, surrounding each central flow port 116a, 116b, 116c is an annular seating portion 115a, 115b, 115c against which a valve seat component may be sealed. While many different valve subassemblies may be utilized, in an exemplary embodiment, the valve cavities 112a, 112b, 112c and seating portions 115a, 115b, 115c may be configured to accommodate the valve 40 and actuator 50 assemblies of the embodiment of FIGS. 1 and 2, and/or the valve and actuator assemblies of the above-incorporated '542 Patent, with the perimeter wall portions 111a, 111b, 111c including female threaded portions for mating with male threaded portions of a seat carrier retaining insert.

Adjacent perimeter wall portions 111a, 111b, 111c of adjacent valve body segments 110a, 110b, 110c may be joined or fused together, for example, to facilitate manufacturing, to reduce overall size of the manifold body 100 and/or to strengthen or reinforce these wall portions. While the conduit end portions 123a, 123b, 123c may be similarly joined with one or more adjacent perimeter wall portions 111a, 111b, 111c, in the illustrated embodiment, the conduit end portions are spaced apart from the perimeter wall portions, and extend above an upper surface of the perimeter wall portions, to facilitate connection to the system (e.g., by welding or conduit fittings), for example, by allowing for lateral movement of the conduit end portions to accommodate tolerance deviations.

The base portions 114a, 114b, 114c may be tapered (e.g., to have an outer diameter smaller than an outer diameter of the perimeter wall), for example, to reduce material usage and/or to provide clearance for one or more of the horizontal flow path portions 121a, 121b, 121c, 121d, such that a horizontal flow path portion of a conduit segment is at least partially laterally aligned with the valve cavity of at least one of the valve segments.

Many different porting arrangements may be provided. In the illustrated embodiment, branch conduit segments 120a, 120b, 120c connect with corresponding ones of the offset flow ports 117a, 117b, 117c, and common conduit segment 120d connects with each of the central flow ports 116a, 116b, 116c, for example, to provide a three-component mixing arrangement, or a distribution arrangement.

Many different manifold body configurations may be provided, including, for example, manifold bodies accommodating different numbers of valve assemblies. Additionally, many different manifold body configurations may be provided, including, for example, manifold bodies accommodating different numbers of valve assemblies, such as, for example, the valve and actuator assemblies of FIGS. 1 and 2, and/or the valve and actuator assemblies of the above incorporated '452 Patent.

In the manifold body 100 of FIGS. 3-3J, apertured mounting bosses 101 are provided to facilitate mounting of the manifold within a system (e.g., to a plate or other such base component of a fluid system). As shown, the mounting bosses may be joined or fused with an adjacent perimeter wall portion 111a, 111c to facilitate manufacturing, to reduce overall size of the manifold body 100 and/or to strengthen or reinforce these joined portions. The mounting bosses 101 may additionally be provided with tapers and/or counterbores, for example, to facilitate centering the head of the installed fastener (e.g., mounting screw, not shown).

Figure 4:
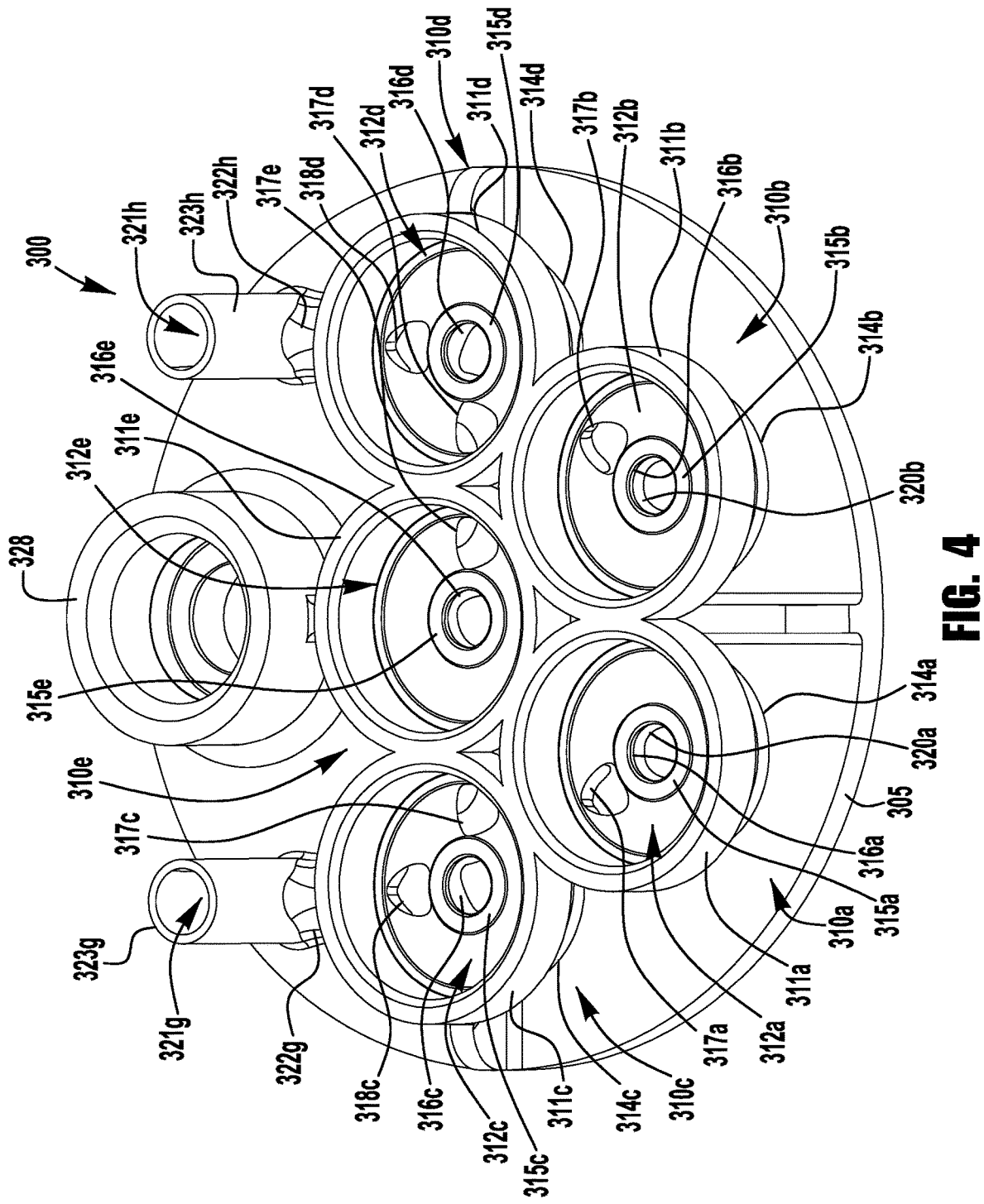
FIG. 4 illustrates an upper perspective view of a canister mountable five-valve manifold body, in accordance with an exemplary embodiment of the present disclosure.
Figure 4A:
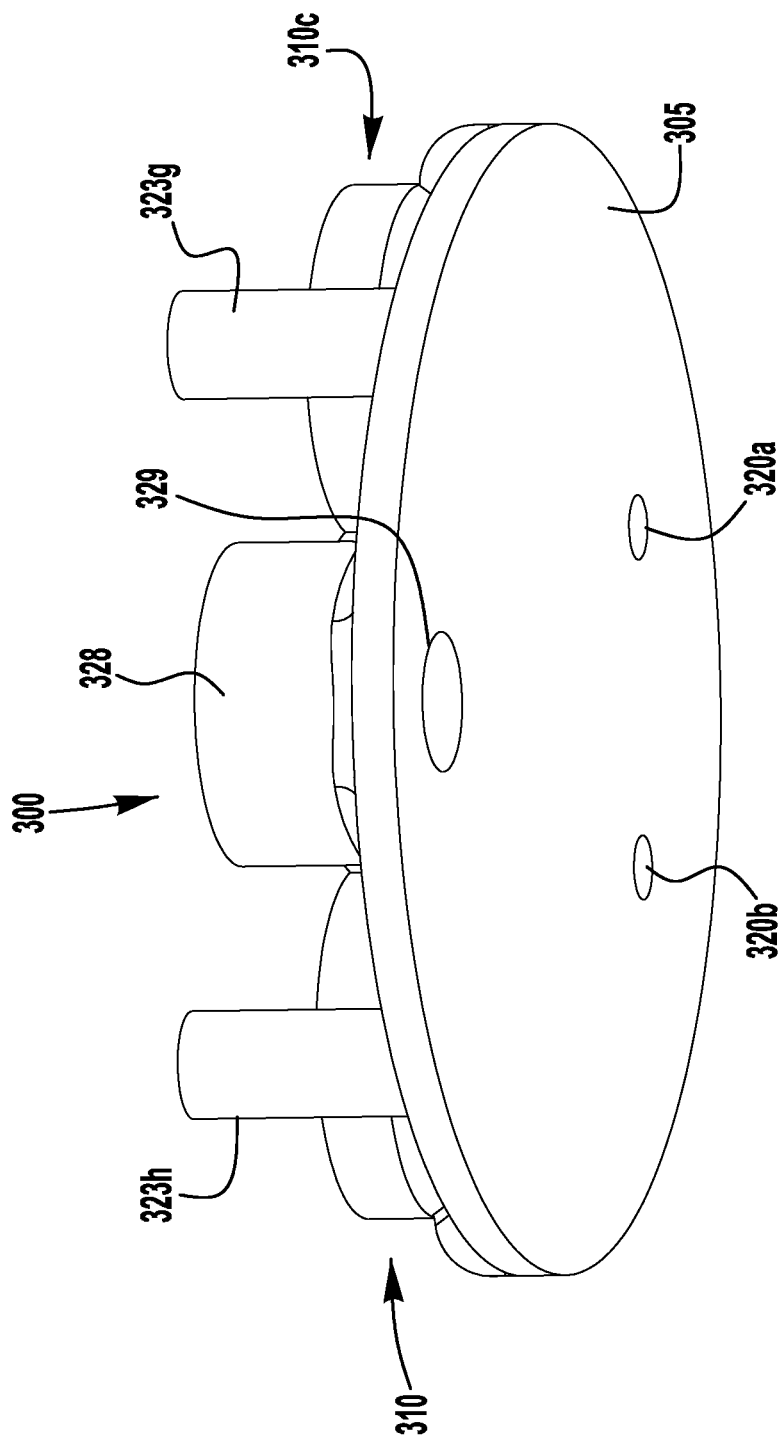
FIG. 4A illustrates a lower rear perspective view of the manifold body of FIG. 4.
Figure 4B:
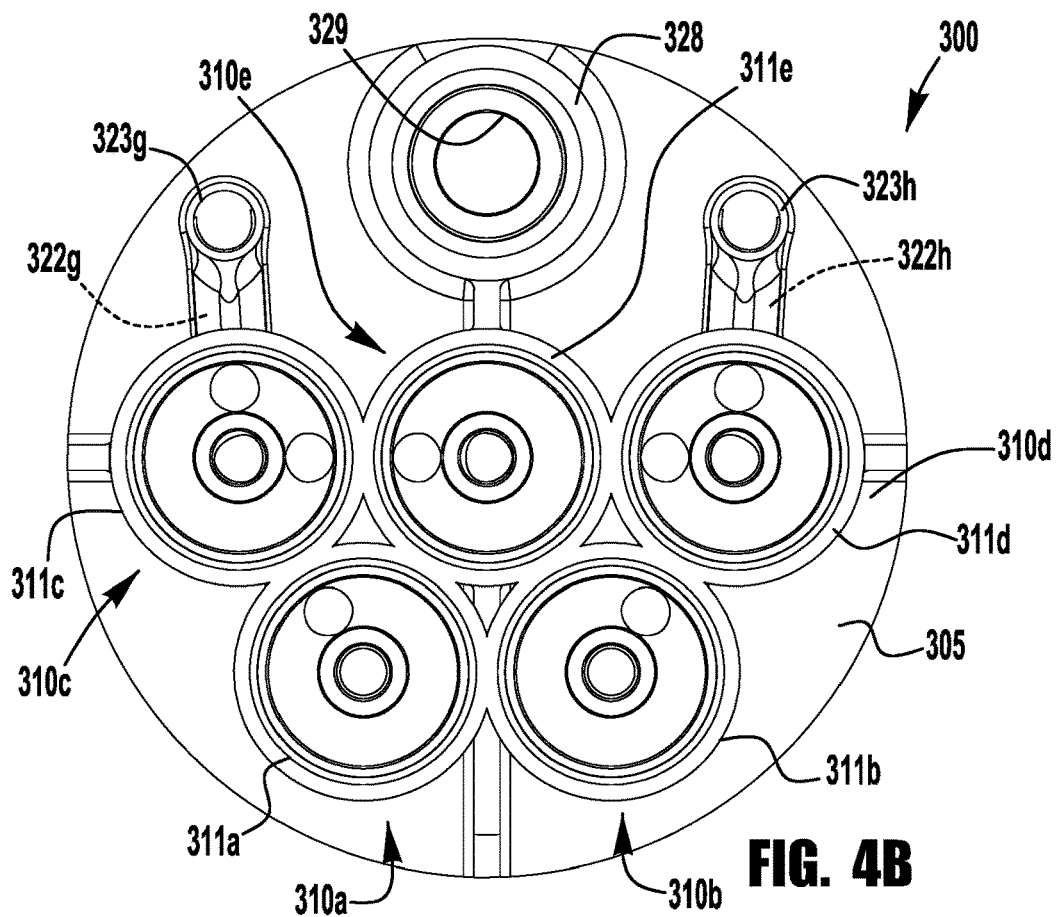
FIG. 4B illustrates a top plan view of the manifold body of FIG. 4.
Figure 4C:
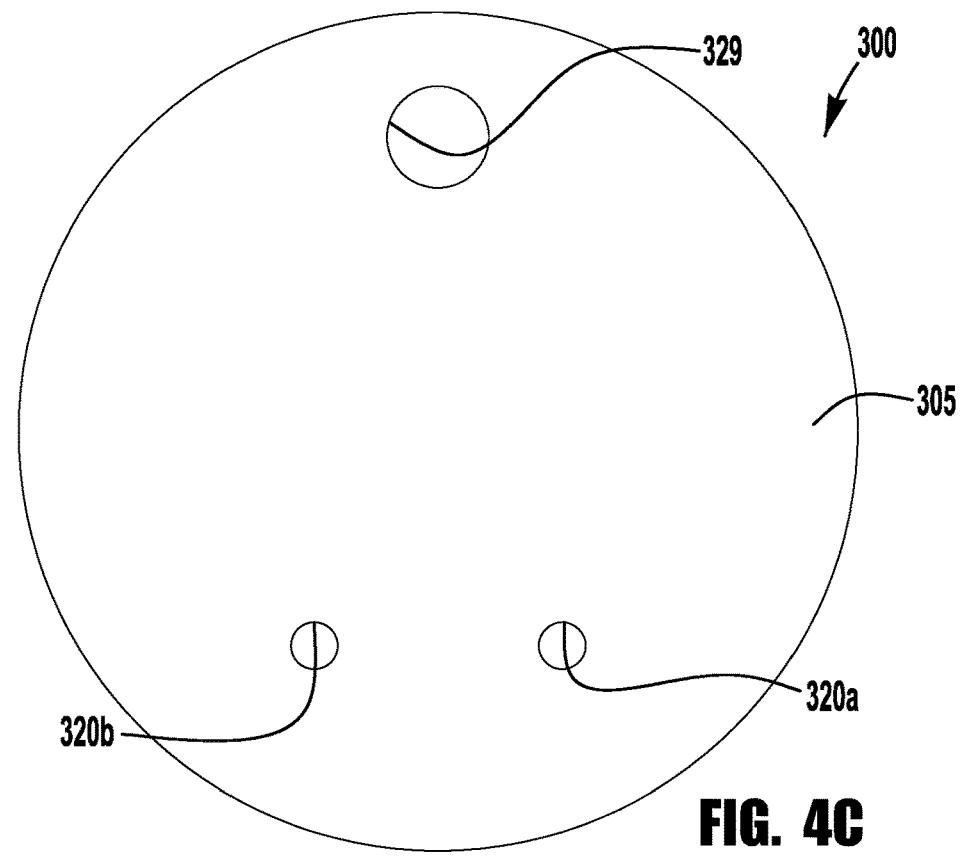
FIG. 4C illustrates a bottom plan view of the manifold body of FIG. 4.
Figure 4J:
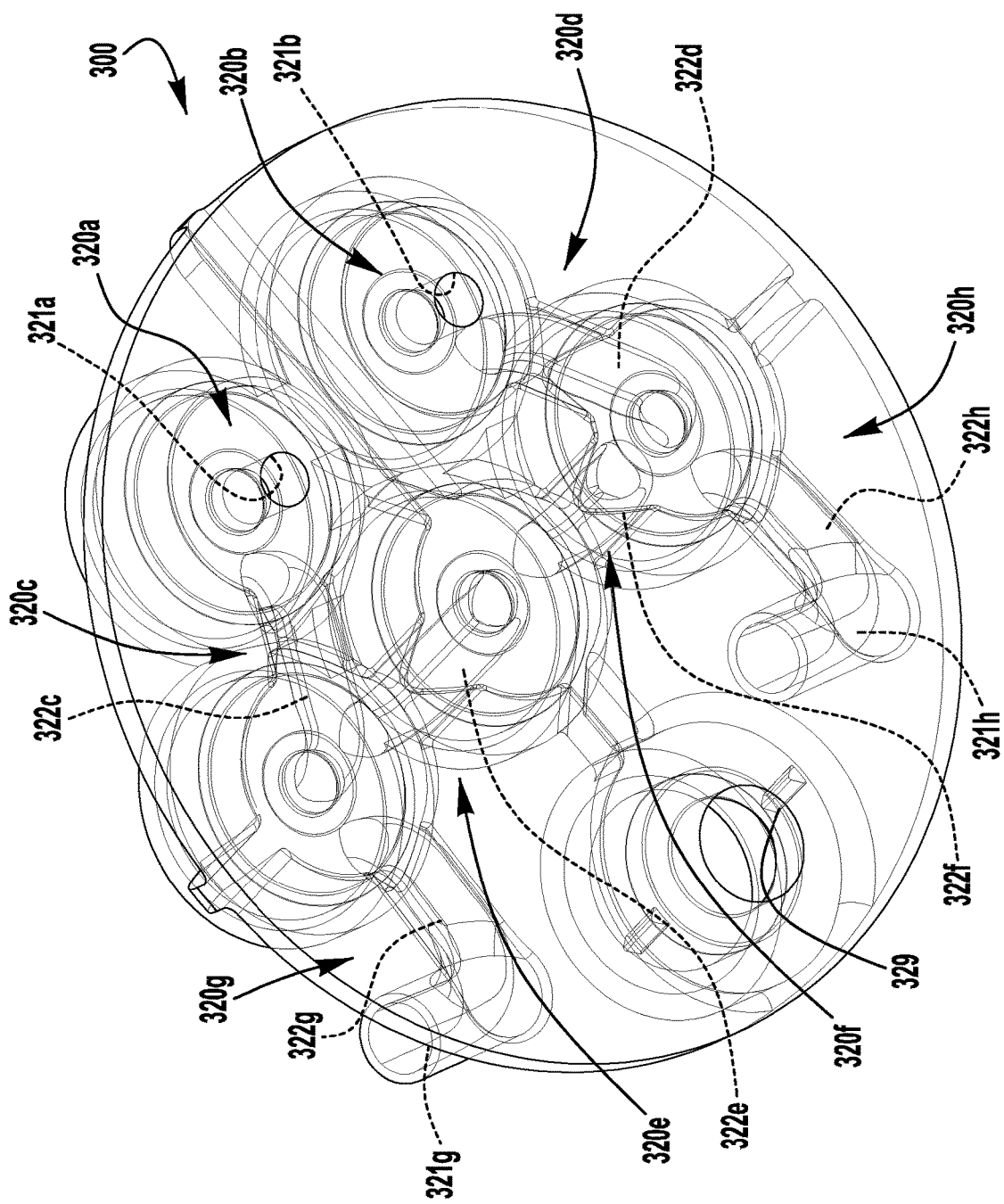
FIG. 4J illustrates a bottom perspective view of the manifold body of FIG. 4, shown in phantom to illustrate additional features of the manifold body.

In other exemplary embodiments, the manifold body may be adapted for other types of mounting or installation arrangements. For example, the manifold body may be formed as an end plate or lid, for example, for a canister, to provide for sampling, purging, or other such fluid control to and/or from the canister. FIGS. 4-4J illustrate an exemplary five-valve manifold body 300 (for use, for example with the valve and actuator assemblies of FIGS. 1 and 2, or the valve and actuator assemblies of the above incorporated '452 Patent), having a lower plate or lid portion 305 sized to be welded or otherwise sealed to an open end of a canister (not shown). As shown, the manifold body 300 includes five valve body segments 310a-e each having an upper perimeter wall portion 311a-e defining a valve cavity 312a-e, and a lower base portion 314a-e joined with the lower plate 305 and defining central flow ports 316a-e (with surrounding seating portions 315a-e) and offset flow ports 317a-e, 318c-d, and a plurality of conduit segments 320a-h (best shown in FIG. 4J) extending from the flow ports 316a-e, 317a-e.

In the exemplary arrangement, first and second conduit segments 320a, 320b are defined by vertical passages 321a, 321b through the lower plate 305 from central flow ports 316a, 316b of first and second valve segments 310a, 310b to a lower surface 306 of the lower plate (e.g., for extraction of fluid samples from the canister). A third conduit segment 320c extends from an offset port 317a of the first valve segment 310a to a central port 316c of a third valve segment 310c, with a horizontal portion 322c of the conduit segment 320c being partially disposed in the lower plate 305. A fourth conduit segment 320d extends from an offset port 317b of the second valve segment to a central port 316d of a fourth valve segment 310d, with a horizontal portion 322d of the conduit segment 320d being partially disposed in the lower plate 305. A fifth conduit segment 320e extends from an offset port 317c of the third valve segment 320c to a central flow port 316e of a fifth valve segment 310e, with a horizontal portion 322e of the conduit segment 320e being partially disposed in the lower plate 305. A sixth conduit segment 320f extends from an offset port 317e of the fifth valve segment 310e to an offset port 317d of the fourth valve segment 310d, with a horizontal portion 322f of the conduit segment 320f being partially disposed in the lower plate 305. A seventh conduit segment 320g includes a horizontal portion 322g extending from a second offset port 318c of the third valve segment 310c, and partially disposed in the lower plate 305, to a vertical end portion 321g extending upward from the lower plate 305 and defining a conduit end portions 323g providing an inlet/outlet port for connection to fluid system components (e.g., conduits) in the fluid system (e.g., by welding or conduit fittings). An eighth conduit segment 320h includes a horizontal portion 322h extending from a second offset port 318d of the fourth valve segment 310d, and partially disposed in the lower plate 305, to a vertical end portion 321h extending upward from the lower plate 305 and defining a conduit end portions 323h providing an inlet/outlet port for connection to fluid system components (e.g., conduits) in the fluid system (e.g., by welding or conduit fittings).

As shown, a supply/drain port 328 may be provided with a passage 329 through the lower plate, for example, for quick filling or drainage of the canister. The port 328 may be plugged or otherwise sealed during normal operation of the canister.

Adjacent perimeter wall portions 311a-e of adjacent valve body segments 310a-e may be joined or fused, for example, to reduce overall size of the manifold body 300 and/or to strengthen or reinforce these wall portions. While the conduit end portions 323g, 323h may be similarly joined with one or more adjacent perimeter wall portions 311a-e, in the illustrated embodiment, the conduit end portions are spaced apart from the perimeter wall portions, and extend above an upper surface of the perimeter wall portions, to facilitate connection to the system (e.g., by welding or conduit fittings), for example, by allowing for lateral movement of the conduit end portions to accommodate tolerance deviations. The base portions 314a-e may be tapered, for example, to reduce material usage and/or to provide clearance for one or more of the horizontal flow path portions.

The overall shape and internal flow path arrangements of a fluid component body (e.g., a manifold body) may make the body difficult to manufacture using conventional machining, molding, or casting techniques. According to an aspect of the present disclosure, a fluid component body, for example, the manifold bodies 100, 300 of FIGS. 3-3J and 4-4J, may be fabricated using additive manufacturing to produce a monolithic body having discrete, but partially joined or fused, valve segments and conduit segments. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition). Providing a manifold body as a single, monolithic component may eliminate assembly costs, reduce component wear, reduce adverse effects from heat cycling, improve corrosion behavior (galvanic effects, crevice, stress corrosion cracking), and reduce lead time to manufacture. Further, fabrication using additive manufacturing may reduce the amount of raw material used, and may reduce the size and weight of the finished body.

While the conduit end portions 323g, 323h of the illustrated embodiment extend substantially vertically upward, in other embodiments, the conduit end portions may extend in other directions, including, for example, at an upward non-vertical angle, horizontally, vertically downward, or at a downward non-vertical angle. Further, while such conduit end portions may be fabricated to extend in such directions, in other embodiments, the conduit end portions may be fabricated to extend in a first direction (e.g., vertically upward, horizontally), and then be bent to extend in a second direction (e.g., horizontally, vertically). For example, for components having significant longitudinal, lateral, and vertical dimensions, 3D printing or other additive manufacturing can be more time consuming and more costly. According to an aspect of the present disclosure, a 3D printed fluid component extending primarily in first and second dimensions (e.g., longitudinal and lateral) may be configured to have one or more portions (e.g., one or more end ports or connecting ports) bent to extend primarily or significantly in a third dimension (e.g., vertical), thereby providing a finished fluid component having significant longitudinal, lateral, and vertical dimensions while reducing 3D printing time and cost.

The conduit end portions may be specifically fabricated to facilitate such bending. For example, the conduit end portion may be formed or fabricated to have a reduced wall thickness on the portions of the conduit end portion subject to bending (e.g., at the axial location of the bend, and/or in the direction of the bend). As another example, the conduit end portion may be provided with a cross-sectional shape selected to facilitate bending—for example, an oblong or high aspect ratio cross-section (e.g., oval-shaped) having a minor diameter oriented in the direction of the intended bend. As still another example, a port or conduit portion formed to be bent in a post-fabrication operation may be shaped and/or orientated to promote a hinging action for desired bending of the conduit. As yet another example, an external surface of the fluid component body may be provided with a bending limit feature, such as, for example, a boss, wall, protrusion, or other body structure sized and positioned to limit bending of the conduit end portion to a desired angle (e.g., by abutting an outer surface of the conduit end portion at the desired angle).

Figure 6:
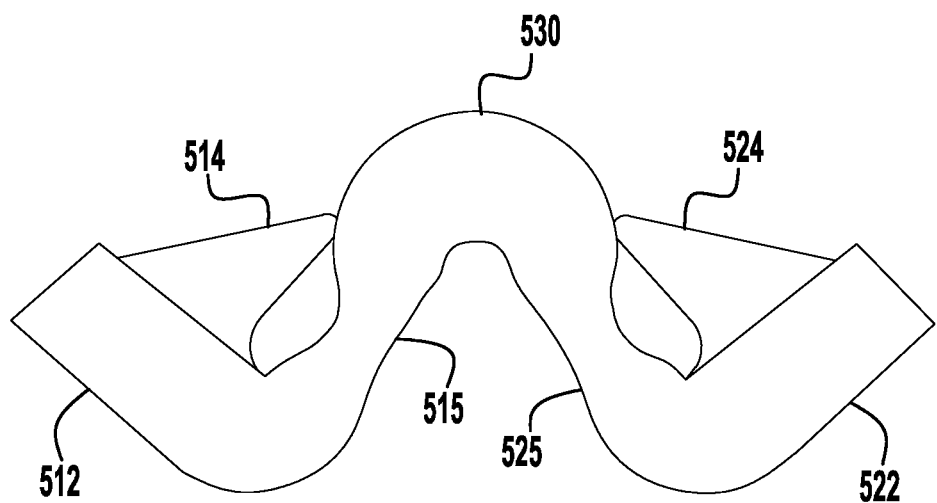
FIG. 6 illustrates the fluid component of FIG. 5, shown in a bent configuration.

FIG. 5 illustrates an exemplary port or conduit 500 of a 3D printed fluid component. The conduit 500 includes first and second longitudinally extending portions 512, 522, first and second vertically extending portions 515, 525, and a U-shaped portion 530 connecting the vertically extending portions. The longitudinally extending portions 512, 522 may extend to other portions of the fluid component (as schematically represented at 511 and 521 in FIG. 5A), such as valve bodies or end fittings. The vertically extending portions 515, 525 are provided with an oblong or high aspect ratio cross-section (e.g., oval-shaped) to facilitate bending of the second longitudinally extending portion into an orientation substantially orthogonal to the first longitudinally extending portion, as shown in FIGS. 5A and 6. In another embodiment (not shown), the port may additionally or alternatively include a U-shaped portion having an oblong or high aspect ratio cross-section (e.g., oval-shaped) to facilitate bending at the U-shaped portion.

Figure 7:
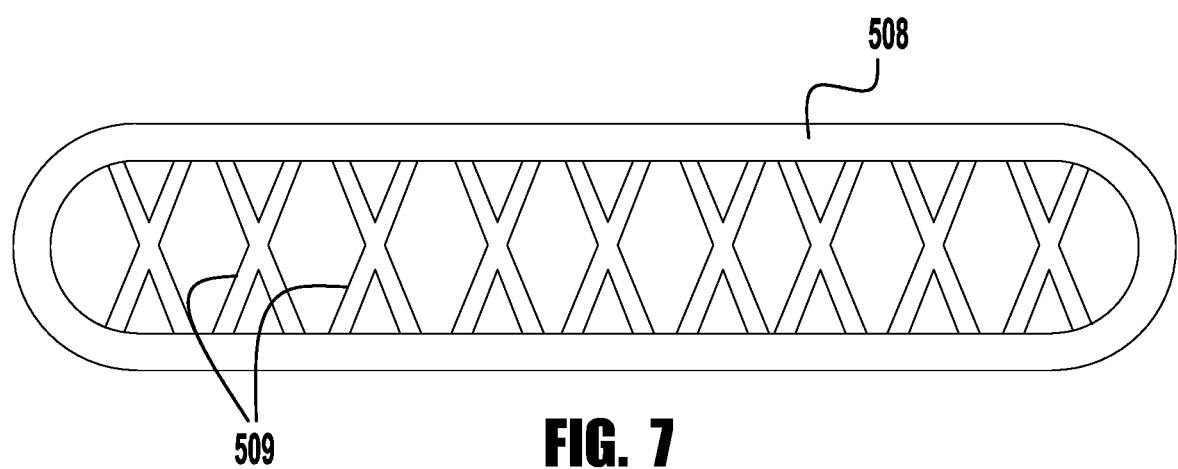
FIG. 7 illustrates a cross sectional view of an oblong portion of a 3D printed conduit, in accordance with an exemplary embodiment.

According to another aspect of the present disclosure, one or more cross-sectional portions (e.g., oblong cross-sectional portions, as described herein) of a 3D printed conduit may be fabricated with internal supports (e.g., an internal lattice) configured to maintain the shape of the conduit portion during 3D printing and/or bending. Once the conduit portion has been bent to a desired configuration, the internal supports may be removed, for example, by using abrasive flow machining (AFM), by which an abrasive-laden fluid is pumped through the conduit to break or erode away the internal supports. Alternatively, the internal supports may be removed (e.g., by AFM, as discussed above) prior to bending, for example, to provide for greater flexibility of the conduit. FIG. 7 illustrates an exemplary cross-section of an oblong conduit portion 508 including internal lattice supports 509.

The conduit or port may be bent using tools configured to bend the second longitudinal portion, with respect to the first longitudinal portion, to a consistent desired orientation (e.g., substantially orthogonal). In other embodiments, the fluid component may be provided with one or more external stop portions configured to provide a positive stop to the bending operation when the longitudinal portions have reached the desired bent orientations. In the embodiment of FIGS. 5 and 6, first and second stop portions 514, 524 extend from exterior surfaces of the longitudinal conduit portions and are sized to contact exterior surfaces of the U-shaped conduit portion 530 (as shown in FIG. 6) when the vertical conduit portions 515, 525 have bent to position the longitudinal conduit portions 512, 522 in the desired orientation. In some embodiments, the stop portions may be sized or positioned to allow for slight over-bending beyond the desired orientation, for example, to account for spring back inherent in the material used (e.g., stainless steel or other metals).

Figure 9:
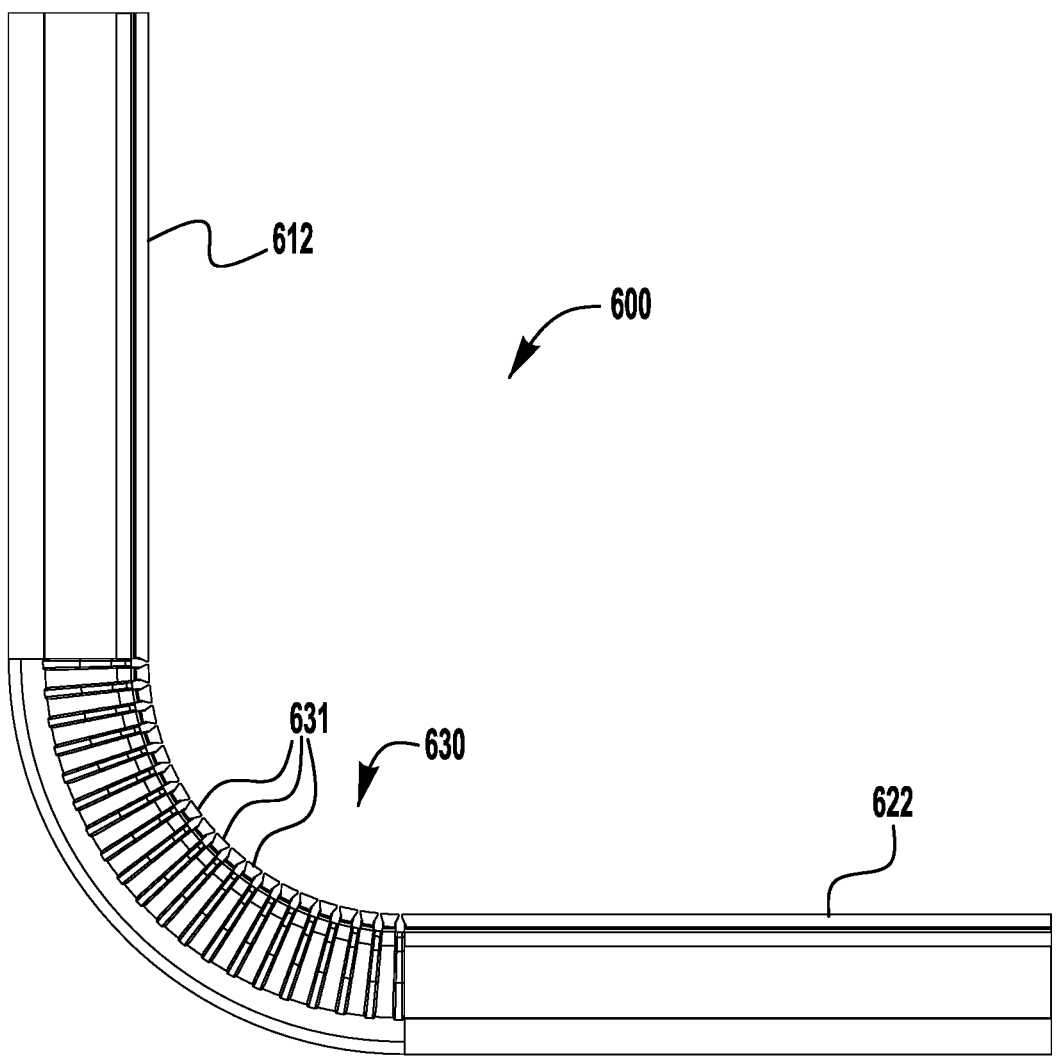
FIG. 9 illustrates the fluid component of FIG. 8, shown in a bent configuration.

Still other arrangements may be utilized to facilitate conduit bending to a desired limit. FIGS. 8 and 9 illustrate an exemplary 3D printed conduit 600 having first and second longitudinal portions 612, 622 and a central bending portion 630 having a reduced wall thickness to facilitate bending, and a row of spaced apart protrusions 631, disposed along a surface intended to be the inner diameter of the bend, that engage each other (see FIG. 9) at a desired bend orientation (e.g., approximately 90°), including adjacent stop portions 632 (see FIG. 8A) that engage each other to provide a controlled, uniform bend with an engineered bend radius, thereby preventing kinking or other bending artifacts that may result from a non-uniform bend. In some embodiments, the stop portions 632 may be sized or positioned to allow for slight over-bending beyond the desired orientation, to account for spring back inherent in the material used (e.g., stainless steel or other metals).

Figure 10:
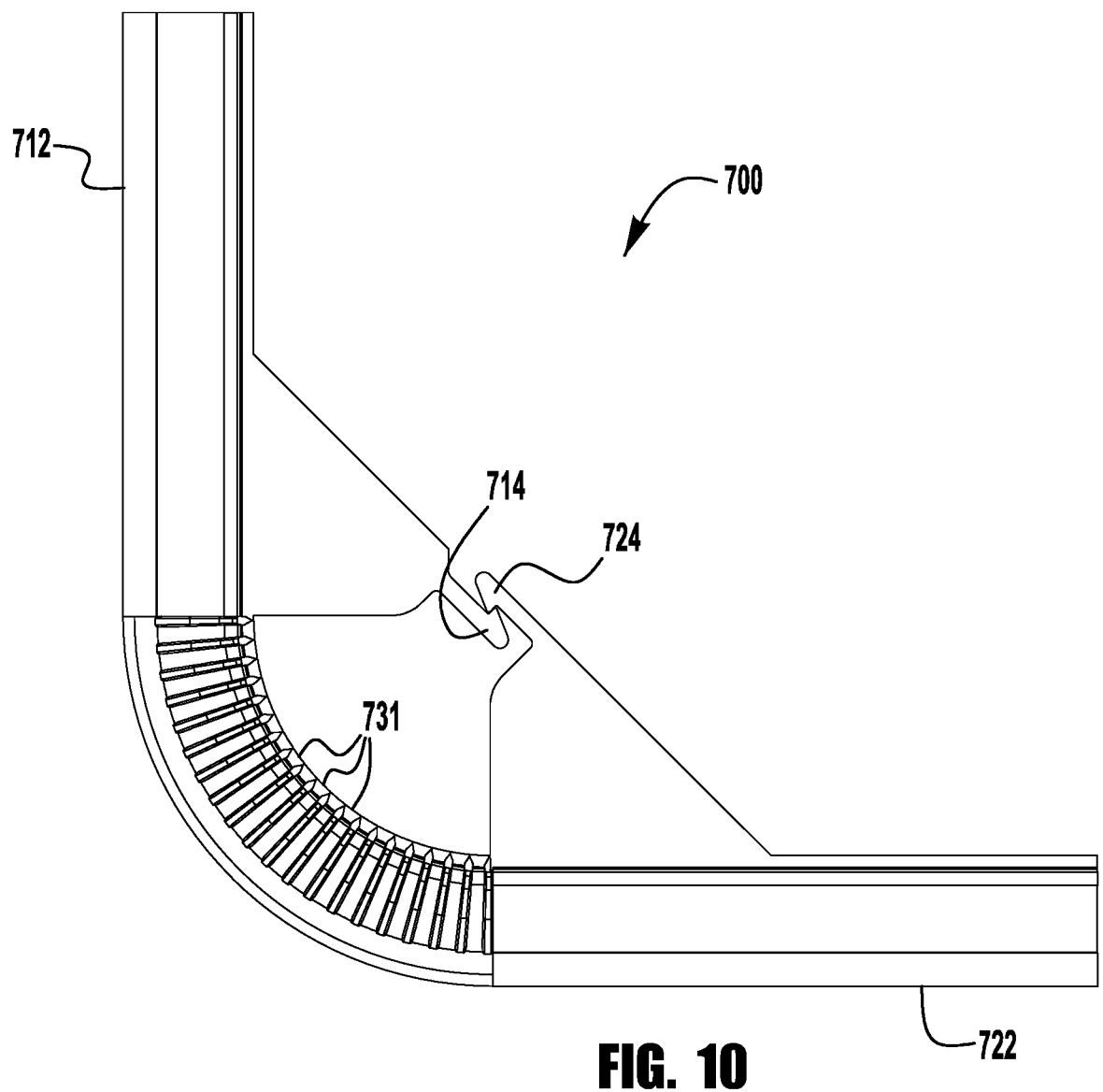
FIG. 10 illustrates a side view of a conduit portion of another fluid component, shown secured in a bent configuration, in accordance with an exemplary embodiment.

According to another aspect of the present application, additional features or arrangements may be provided to secure the bent conduit in the desired configuration. For example, contacting external surfaces (e.g., conduit surfaces and stop portions) may be joined or fused (e.g., tack-welding or adhesive) to secure the conduit in the desired bent position. As another example, external structural features may be provided to effect a press fit, snap-fit or mating engagement in the desired bent condition. FIG. 10 illustrates an exemplary 3D printed conduit 700, similar to the conduit 600 of FIGS. 8 and 9, having snap-fit latch portions 714, 724 extending from the first and second longitudinal portions of the conduit. When the conduit 700 is bent to the desired configuration, the latch portions 714, 724 snap into interlocking engagement with each other to secure the bent conduit in the desired configuration. While the conduit 700 is shown with spaced apart bend controlling protrusions 731, similar to the protrusions 631 of the conduit 600 of FIGS. 8 and 9, in other embodiments, bendable conduits having snap-fit latch portions may be provided without additional bend limiting features, or with different bend limiting features.

In addition to accommodating different valve and/or conduit segment arrangements in a fluid component body, as described above, additive manufacturing of the fluid component body may facilitate incorporation of additional features. For example, additive manufacturing may be utilized to produce one or more internal flow paths in a fluid component body that are configured to include one or more flow path discontinuities along one or more legs of the internal flow path, including, for example, deviations in flow path cross-sectional shape, cross-sectional size, flow path center line, and internal surface characteristics. Many different types of flow path discontinuities may be provided to facilitate a variety of flow conditions.

Figure 11:
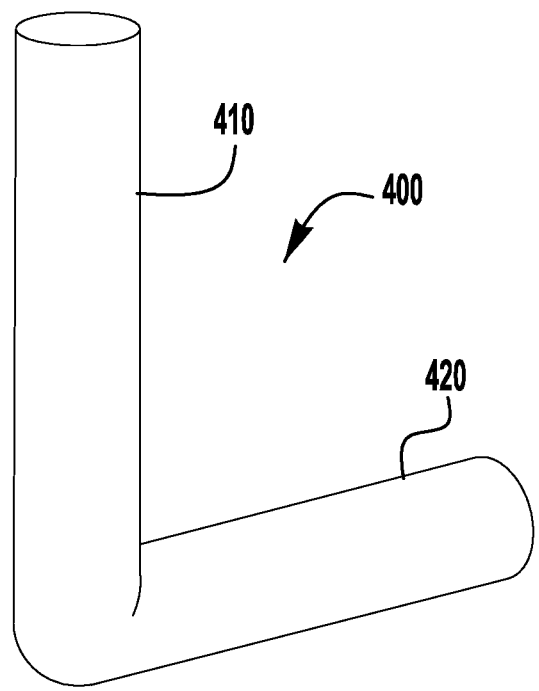
FIG. 11 illustrates a perspective view of an exemplary fluid system flow path.

By way of example, in some applications, fluid system flow paths require a very smooth or highly polished surface finish, for example, to minimize the generation of particle contamination or fluid entrapment. For long and/or complex (non-straight) flow paths (e.g., the elbow-shaped flow path 400 of FIG. 11), polishing may be accomplished using abrasive flow machining (AFM) or abrasive flow finishing (AFF), by which an abrasive-laden fluid is pumped through a workpiece to remove or erode surface material from rough internal flow path surfaces to produce smoother, polished surfaces. This process can be relatively inefficient, particularly for long, straight cylindrical flow paths which limit the shear action of the abrasive fluid along the flow path walls. According to an aspect of the present disclosure, extended internal flow paths may be adapted to provide flow path discontinuities configured to provide increases in one or more of flow shear, flow compression, and flow incidence for accelerated erosion of the flow path surfaces. In some applications, a first portion of the flow path (e.g., a first leg or vertical portion 410 of the flow path 400) may extend to an external surface of the fluid component body and may be more easily accessed by conventional mechanical polishing techniques, and therefore may be provided without flow path discontinuities along certain portions of the flow path, with the discontinuities being limited to, or concentrated in, a second portion of the flow path (e.g., a horizontal or second leg portion 420 of the flow path 400).

Figure 3I:
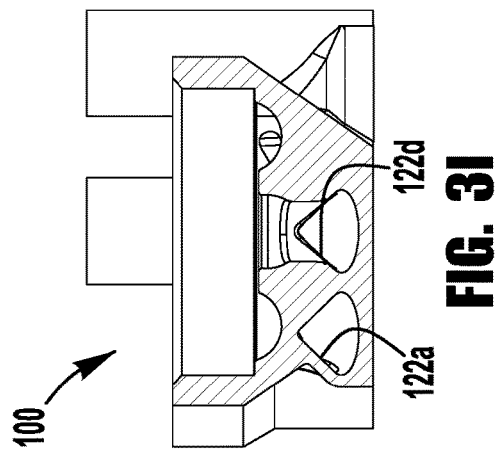
FIG. 3I illustrates a second cross-sectional view of the manifold body of FIG. 3.
Figure 12:
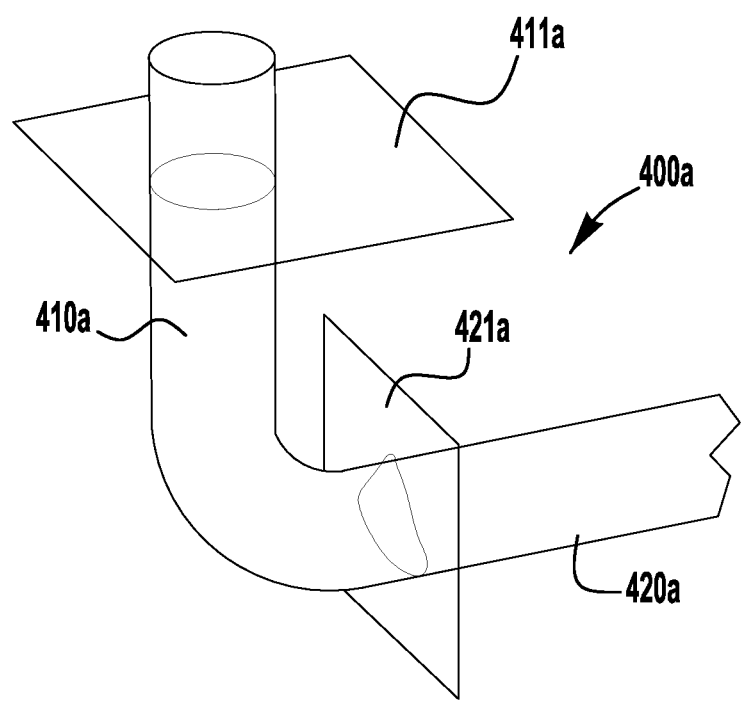
FIG. 12 illustrates a perspective view of an exemplary fluid system flow path having a discontinuous cross-sectional shape, in accordance with an exemplary embodiment of the present disclosure.

Many different types of flow path discontinuities may be provided in accordance with the present disclosure. As one example, a flow path may be provided with a varying cross-sectional shape, for example, to increase the shear action of the abrasive laden fluid against the flow path walls. The cross-sectional shape of the flow path may be varied between two or more suitable shapes, including, for example, circular, oval, square, rectangular, and triangular, as well as more complex shapes, including a teardrop shape. FIG. 12 illustrates an exemplary elbow shaped flow path 400a having a circular cross-section at a first cross-sectional plane 411a (e.g., along the first leg flow path portion 410a) and a teardrop cross-section at a second cross-sectional plane 421a (e.g., along the second leg flow path portion 420a), with the transition from circular to teardrop cross-section occurring along the bend in the elbow. In the exemplary manifold body 100 of FIGS. 3-3J, horizontal flow path portions 122a, 122d are provided with a similar teardrop-shaped cross-section, as shown in FIG. 3I. In other embodiments, additional or alternative cross-sectional shape changes may be provided, for example, along the length of the first leg flow path portion 410a and/or along the length of the second leg flow path portion 420a. A flow path of varying cross-sectional shape may, but need not, be configured to have a substantially constant cross-sectional area along the length of the flow path, for example, to maintain the desired flow properties while providing increased shear action against the flow path walls as a result of the changing cross-sectional shape.

Figure 13:
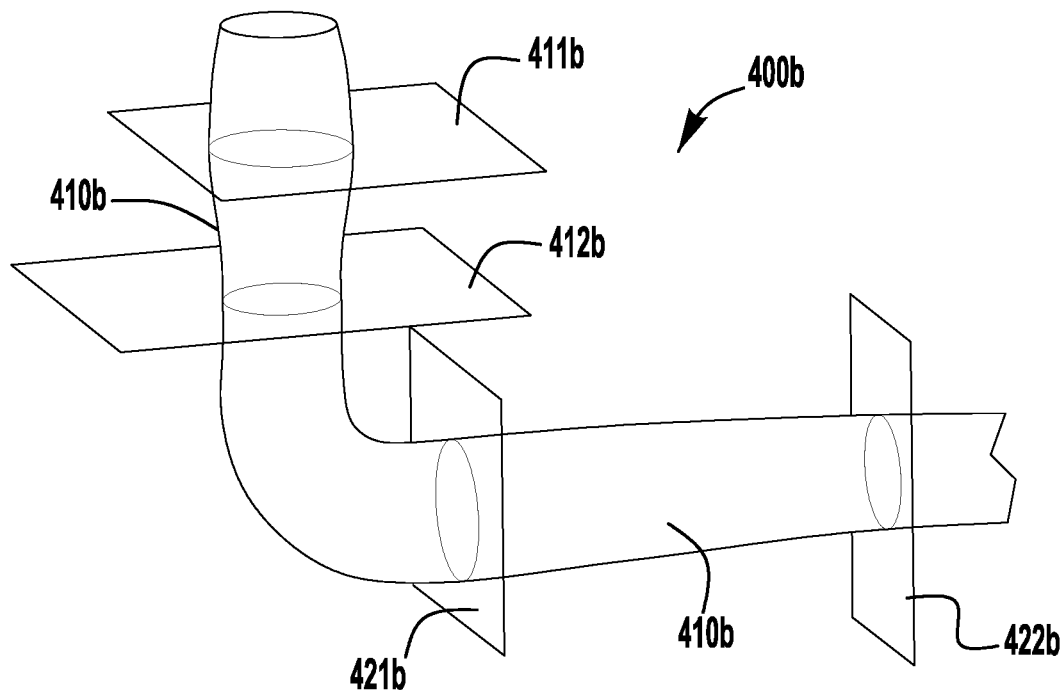
FIG. 13 illustrates a perspective view of an exemplary fluid system flow path having a discontinuous cross-sectional size, in accordance with an exemplary embodiment of the present disclosure.

In another exemplary embodiment, a flow path may be provided with a varying cross-sectional area, for example, to increase compression of the abrasive laden fluid at the smaller cross-sectional area (or "necked down") portions, to increase the erosive effects at or near these necked down portions. FIG. 13 illustrates an exemplary elbow shaped flow path 400b having first leg and second leg flow path portions 410b, 420b with varying cross-sectional areas at various cross-sectional planes 411b, 412b, 421b, 422b along the length of the flow path 400b. In the illustrated embodiment, the first leg flow path portion 410b varies in cross-sectional area between a maximum area cross-sectional plate 411b and a minimum area cross-sectional plane 412b, and the second leg flow path portion 420b varies in cross-sectional area between a maximum area cross-sectional plate 421b and a minimum area cross-sectional plane 422b. In other embodiments, portions of the flow path (e.g., the entire first leg flow path portion) may have a uniform cross-sectional area. A flow path of varying cross-sectional size may, but need not, be configured to have a substantially constant cross-sectional shape (e.g., circular) along the length of the flow path. Flow through the flow path may be primarily limited by the smallest cross-sectional area along the length of the flow path, and the flow path may be sized accordingly.

In some such exemplary embodiments, longer flow channels in a fluid component body may be configured to provide progressively restricted flow in the direction of fluid flow (e.g., inlet to outlet, or inlet to port center point), for example, to improve the efficacy of abrasive flow finishing. The internal surfaces may be gradually tapered radially inward, or more sharply tapered (e.g., stepped) radially inward, or by a combination of two or more types of flow path profiles. The desired amount of flow path restriction may be based at least in part on the relative pressure loss of the abrasive laden fluid (which may be a function of viscosity and frictional losses, for example, due to abrasive cutting forces), with more aggressive media (with higher pressure losses) potentially benefitting from more aggressive flow path tapering. This restriction in flow area may be correlated to a length of the passage, for example, with the flow path area reduction being quantified as a percentage reduction in area per inch of port length (e.g., 15%-30% per inch of port length).

Figure 14:
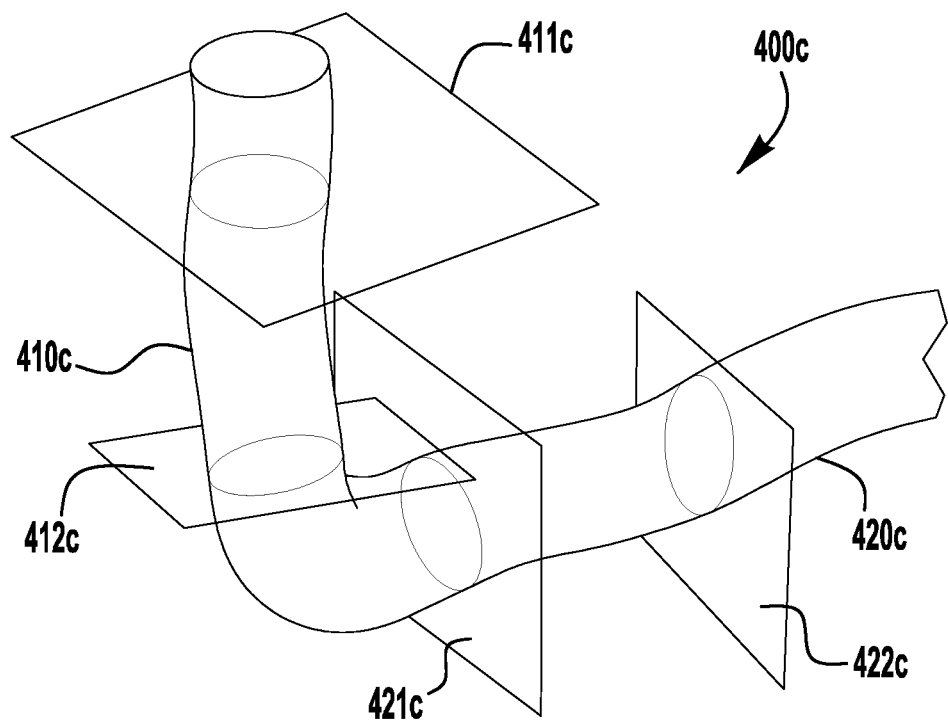
FIG. 14 illustrates a perspective view of an exemplary fluid system flow path having a discontinuous cross-sectional central axis, in accordance with an exemplary embodiment of the present disclosure.

In another exemplary embodiment, a flow path may be provided with non-linear flow path portions having a varying center line (i.e., non-coaxial), for example, to change direction of the flow path to affect the angle of incidence of the abrasive laden fluid against the walls of the flow path, to increase the erosive effects on the flow path walls. Many different types of non-linear flow paths may be utilized. FIG. 14 illustrates an exemplary elbow shaped flow path 400c having first leg and second leg flow path portions 410c, 420c with a curved helical flow path resulting in variations in the center line locations at various cross-sectional planes 411c, 412c, 421c, 422c along the length of the flow path 400c. In the illustrated embodiment, the first leg and second leg flow path portions 410c, 420c are provided with continuously varying center lines resulting from a continuous helical pattern. In other embodiments, portions of the flow path (e.g., the entire first leg flow path portion) may have a constant center line (i.e., substantially linear). A flow path of varying cross-sectional size may, but need not, be configured to have a substantially constant cross-sectional shape (e.g., circular) and a substantially constant cross-sectional size along the length of the flow path.

Figure 15:
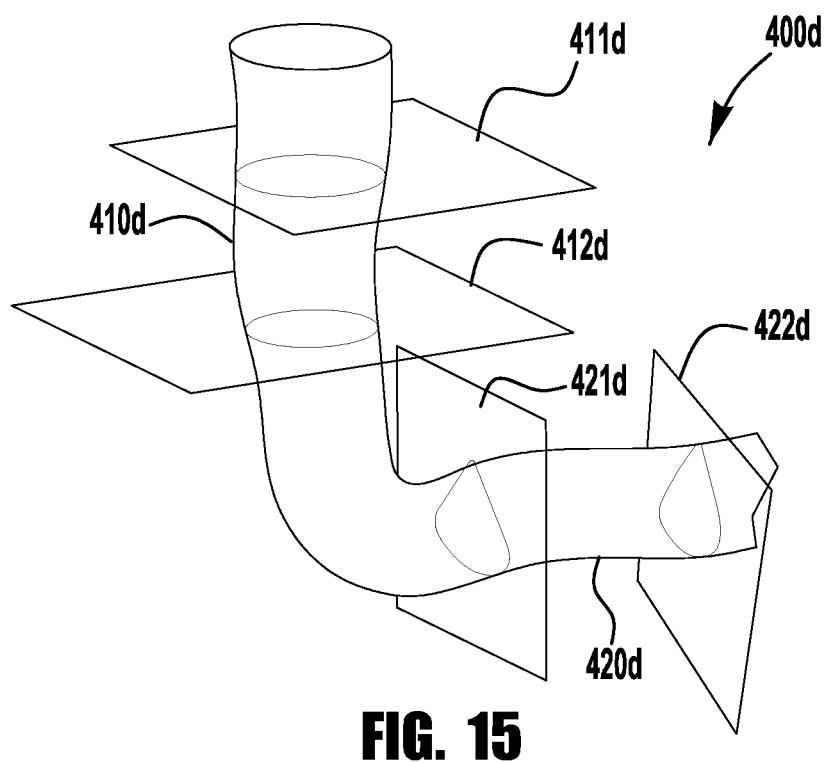
FIG. 15 illustrates a perspective view of an exemplary fluid system flow path having a discontinuous cross-sectional shape, size, and central axis, in accordance with an exemplary embodiment of the present disclosure.

In other embodiments, a flow path maybe provided with two or more of: (a) a varying cross-sectional shape, (b) a varying cross-sectional area, and (c) a varying center line. FIG. 15 illustrates an exemplary elbow shaped flow path 400d having first leg and second leg flow path portions 410d, 420d with varying cross-sectional shapes, areas, and center lines at various cross-sectional planes 411d, 412d, 421d, 422d along the length of the flow path 400d.

Additive manufacturing of the fluid component body may facilitate incorporation of additional features. As another example, the internal flow path surfaces of a fluid component body may be textured to affect fluid flow properties, such as, for example, altering turbulent flow conditions and/or reducing the propensity for contaminants or process fluid adsorbing to the internal surfaces. As one example, a flow path may be formed with an internal surface provided with a pattern of surface discontinuities, such as, for example, dimples, raised protuberances, grooves, or other such surface features. These surface discontinuities may, for example, be quantified based on depth and/or surface area (e.g., axial length, circumferential width, diameter) as a percentage of a flow path dimension, such as, for example, bore diameter. In one such exemplary embodiment, a flow path internal surface is provided with an array of spherical dimples having a spherical radius of approximately $1/10^{th}$ of the effective bore diameter, and a dimple depth of approximately $1/50^{th}$ of the effective bore diameter. Such dimples may, for example, be spaced to achieve approximately 50% surface density on the bore inner diameter.

As another example, additive manufacturing may be utilized to provide portions of the flow path(s) that are layered with a material or materials having a desired thermal conductivity, corrosion resistance, hardness, or other such properties.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A method of fabricating a fluid component, the method comprising:
    forming, using additive manufacturing, a conduit having first and second portions connected by a central portion with an oblong cross-section having a minor diameter oriented in the direction of the bend and internal supports within the oblong cross-section;
    bending the central portion of the conduit to reorient the second portion of the conduit with respect to the first portion of the conduit; and
    removing the internal supports before or after bending the central portion of the conduit.

2. The method of claim 1, wherein bending the central portion of the conduit comprises orienting the second portion of the conduit substantially perpendicular to the first portion of the conduit.

3. The method of claim 1, wherein the conduit includes at least a first bending limit feature on an external surface of the conduit sized and positioned to limit bending of the central portion of the conduit to a desired angle, wherein bending the central portion of the conduit comprises bending the central portion of the conduit until the first bending limit feature abuts a portion of the conduit.

4. The method of claim 3, wherein bending the central portion of the conduit comprises bending the central portion of the conduit until the first bending limit feature abuts a second bending limit feature.

5. The method of claim 4, wherein the first and second bending limit features comprise protrusions on an outer surface of the conduit along an inner bend diameter.

6. The method of claim 1, wherein removing the internal supports before or after bending the central portion of the conduit comprises removing the internal supports before bending the central portion of the conduit.

7. The method of claim 1, wherein removing the internal supports before or after bending the central portion of the conduit comprises removing the internal supports after bending the central portion of the conduit.

8. The method of claim 1, wherein prior to bending, the first and second portions of the conduit are substantially colinear.

9. The method of claim 1, further comprising securing the first and second portions of the conduit in a desired bent orientation using at least one of tack-welding, adhesive, and interengaging structural features provided to effect one of a press fit, snap-fit, or mating engagement.

10. The method of claim 1, wherein bending the central portion of the conduit comprises overbending beyond a desired orientation of the second portion of the conduit and allowing the second portion of the conduit to spring back to the desired orientation.

11. A method of fabricating a fluid component, the method comprising:
    forming, using additive manufacturing, a monolithic fluid component body including a conduit having first and second portions connected by a central portion and a valve segment having an annular upper perimeter wall portion defining a valve cavity and a lower base portion defining first and second flow ports, with the first portion of the conduit extending from one of the first and second flow ports and the second portion of the conduit defining a tubular portion extending in a first direction and spaced apart from a remainder of the fluid component body; and
    bending the central portion of the conduit to reorient the second portion of the conduit with respect to the first portion of the conduit, such that the second portion of the conduit is reoriented from a first direction to a second direction;
    wherein the central portion of the conduit has a reduced wall thickness relative to the first and second portions of the conduit.

12. The method of claim 11, wherein the first direction is substantially horizontal and the second direction is substantially vertical.

13. The method of claim 11, further comprising securing the first and second portions of the conduit in a desired bent orientation using at least one of tack-welding, adhesive, and interengaging structural features provided to effect one of a press fit, snap-fit, or mating engagement.

14. A method of fabricating a fluid component, the method comprising:
    forming, using additive manufacturing, a monolithic fluid component body including a conduit having first and second portions connected by a central portion and a valve segment having an annular upper perimeter wall portion defining a valve cavity and a lower base portion defining first and second flow ports, with the first portion of the conduit extending from one of the first and second flow ports and the second portion of the conduit defining a tubular portion extending in a first direction and spaced apart from a remainder of the fluid component body; and
    bending the central portion of the conduit to reorient the second portion of the conduit with respect to the first portion of the conduit, such that the second portion of the conduit is reoriented from a first direction to a second direction;
    wherein the central portion of the conduit has a reduced wall thickness at a circumferential location corresponding to a direction of the bend.

15. A method of fabricating a fluid component, the method comprising:
    forming, using additive manufacturing, a monolithic fluid component body including a conduit having first and second portions connected by a central portion and a valve segment having an annular upper perimeter wall portion defining a valve cavity and a lower base portion defining first and second flow ports, with the first portion of the conduit extending from one of the first and second flow ports and the second portion of the conduit defining a tubular portion extending in a first direction and spaced apart from a remainder of the fluid component body; and bending the central portion of the conduit to reorient the second portion of the conduit with respect to the first portion of the conduit, such that the second portion of the conduit is reoriented from a first direction to a second direction;

wherein the monolithic fluid component body includes a bending limit feature on an external surface of the body sized and positioned to limit bending of the second portion of the conduit to a desired angle, wherein bending the second portion of the conduit from the first direction to the second direction comprises bending the second portion of the conduit until an outer surface of the conduit abuts the bending limit feature.

16. The method of claim 15, wherein the central portion of the conduit has a reduced wall thickness relative to the first and second portions of the conduit.

17. The method of claim 16, further comprising securing the first and second portions of the conduit in a desired bent orientation using at least one of tack-welding, adhesive, and interengaging structural features provided to effect one of a press fit, snap-fit, or mating engagement.

18. The method of claim 15, wherein bending limit feature comprises a first bending limit feature, and wherein bending the second portion of the conduit until the outer surface of the conduit abuts the bending limit feature comprises bending the central portion of the conduit until the first bending limit feature abuts a second bending limit feature.

19. The method of claim 15, further comprising securing the first and second portions of the conduit in a desired bent orientation using at least one of tack-welding, adhesive, and interengaging structural features provided to effect one of a press fit, snap-fit, or mating engagement.

20. The method of claim 15, wherein bending the central portion of the conduit comprises overbending beyond a desired orientation of the second portion of the conduit and allowing the second portion of the conduit to spring back to the desired orientation.

* * * * *